United States Patent [19]

Gagliardi et al.

[11] Patent Number: 5,442,630
[45] Date of Patent: Aug. 15, 1995

[54] ISDN INTERFACING OF LOCAL AREA NETWORKS

[76] Inventors: Ugo O. Gagliardi; Meichun Hsu, both of 5 Manor Pkwy., Salem, N.H. 03079; Paul Cummings, 53 Lawndale St., Belmont, Mass. 02178; Stephen A. Mattin, 5 Manor Pkwy., Salem, N.H. 03079

[21] Appl. No.: 94,143
[22] PCT Filed: May 25, 1991
[86] PCT No.: PCT/US91/03614
§ 371 Date: Dec. 14, 1993
§ 102(e) Date: Dec. 14, 1993
[87] PCT Pub. No.: WO92/21189
PCT Pub. Date: Nov. 26, 1992
[51] Int. Cl.⁶ .......................... H04J 3/26; H04L 12/66
[52] U.S. Cl. .................. 370/85.13; 370/94.1; 370/110.1; 370/118
[58] Field of Search ........... 370/58.1, 60, 60.1, 370/85.13, 85.14, 85.7, 85.8, 94.1, 94.2, 95.1, 95.2, 79, 17, 110.1, 118, 54; 375/122

[56] References Cited

U.S. PATENT DOCUMENTS

| 4,706,081 | 11/1987 | Hart et al. | 370/94.1 |
| 4,805,167 | 2/1989 | Leslie et al. | 370/84 |
| 4,926,420 | 5/1990 | Shimizu | 370/94.1 |
| 4,996,685 | 2/1991 | Farese et al. | 370/58.1 |
| 5,208,811 | 5/1993 | Kashio et al. | 370/94.1 |

FOREIGN PATENT DOCUMENTS 0331190 9/1989 European Pat. Off. ......... 370/85.13

Primary Examiner—Hassan Kizou
Attorney, Agent, or Firm—Lowe, Price, LeBlanc & Becker

[57] ABSTRACT

An ISDN gateway for local area networks comprises at least one circuit board resident at each network for carrying out protocol conversion and other network interface functions. Two embodiments of the gateway provide bridger and router gateway services, respectively. To improve bandwidth utilization of the ISDN line while transferring voice or data, a B-channel allocation algorithm executed by the gateway and the ISDN line dynamically allocates bandwidth by monitoring traffic at each destination queue and responsively allocating or deallocating virtual B-channels. Bandwidth utilization is optimized by packaging data packets into trains that are transmitted to the destination when the train is completed and upon satisfaction of other conditions. Each train undergoes data compression by execution of a suitable compression algorithm.

14 Claims, 14 Drawing Sheets

ISDN INTERFACING OF LOCAL AREA NETWORKS

TECHNICAL FIELD

The invention is directed generally to Integrated Services Digital Networks (ISDN), and more particularly to interfacing local area networks to an ISDN line.

BACKGROUND ART

Utilization of personal computers in business and scientific applications has proliferated considerably over the past decade. There is increasing use of small, single-function systems, such as word processors and small business computers. To share and exchange data between system, and to share resources, systems have been constructed as a centralized network having a single centralized controller operating multiple terminals in a time shared manner. This has evolved into a so-called distributed network which divided tasks among computing facilities, each termed a "node"; the intelligence residing at each node is termed a "host".

Distributed networks can be organized in a number of ways, either globally covering great distances or they can be local area networks (LAN) covering relatively short distances. A LAN ordinarily will consist of computers distributed within an office, a building or a campus. More information on local area networks is available in numerous texts, such as Keiser, *Local Area Networks*, second edition, McGraw Hill, Inc., 1989.

Three basic methods to connect local area networks to other networks are bridgers, routers and gateways. Bridges are data-link layer devices that connect similar networks together, e.g., Ethernet to Ethernet. Routers operate at Layer 3 of the OSI model, performing alternate routing by maintaining a routing table in each host. Gateways operate at the higher OSI Layers, carrying out protocol conversion and other connectivity functions. The term "gateway" will be used hereinafter as a term generic to bridgers, routers and gateways.

Personal computers or local area networks are interconnected by a transmission medium, such as coaxial cable, twisted wire pairs and optical fibers, depending principally on the rate of data transfer required. The present invention utilizes Integrated Services Digital Network (ISDN) to enable local area networks to be interconnected with each other to form a wider area network or to enable a local area network to be accessed by a remote personal computer and operated as if the computer were resident on the network.

ISDN is a relatively newly developed and emerging field of telecommunications which integrates computer and communications technologies to provide, worldwide, a common, all-digital network. This is based, in part, on standardizing the structure of digital protocols developed by the International Telegraph and Telephone Consultative Committee (CCITT). Despite the implementation of multiple networks within national boundaries, from a user's point of view there is a single, uniformly accessible, worldwide network capable of handling a broad range of telephone, data and other conventional and enhanced services.

A complete description of the architecture of ISDN is beyond the scope of this specification. For details, and for an extensive bibliography of references on ISDN, see Stallings, *ISDN, An Introduction*, MacMillan Publishing Company, 1989.

ISDN is structured by architecture closely following the OSI Seven Layer Reference Model. Within the framework of ISDN, the network provides services and the user accesses the services through the user-network interface. A "channel" represents a specified portion of the information carrying capacity of an interface. Channels are classified by two types, Basic Rate ISDN (BRI) and Primary Rate ISDN (PRI). BRI delivers two B-channels, each having a capacity of 64Kbps, capable of transmitting voice and data simultaneously. A 16Kbps D-channel transmits call control messages and user packet data. PRI provides twenty three B-channels of 64Kbps capacity each for carrying voice, circuit switched data or packet data. The D-channel is a 64Kbps signaling channel. The B and D channels are logically multiplexed together at Layer 1 of the OSI Reference Model.

FIG. 1 depicts the conventional ISDN interfaces. At the customer premises, an "intelligent" device, such as a digital PBX terminal controller or LAN, can be connected to an ISDN terminal TE, such as a voice or data terminal, which is connected to a Network Termination (NT1). Non-ISDN terminals TE may be connected to a Network Termination (NT2) and a Terminal Adapter TA. The NT2 in turn is connected over an "S/T-Interface", which is a four-wire bus, to a termination NT1 that performs functions such as signal conversion and maintenance of the electrical characteristics of the loop.

At the local loop, a two-wire bus, termed the "U-Interface", or "Loop", interconnects NT1 and a Loop Termination (LT) at the central office. Finally, the "U-Interface" is a bus between the local loop at the carrier end and exchange switching equipment. Details of this architecture are provided in *ISDN: An Overview, Data Pro Research, Concepts & Technologies*, MT 20–365; pp 101–110, published by McGraw Hill, Incorporated (December 1988).

An ISDN gateway must satisfy several functions. It must be capable of transferring files on the ISDN at a very high rate of data transfer. The gateway furthermore must be "transparent" to the user, that is, the user of a computer should not be able to distinguish between data transfer among local resources and remote data transfer over the ISDN. Furthermore, standard communications software available for personal computers should be application to communications on the ISDN. Bandwidth utilization of the ISDN line must be efficient and independent of the amount of traffic encountered. Preferably, to enable local area networks anywhere to access an ISDN line, gateway hardware and programming will be resident at customer premises equipment, rather than at the central office.

DISCLOSURE OF THE INVENTION

Accordingly, one object of the invention is to connect local area networks to an ISDN line.

Another object of the invention is to connect different local area networks to an ISDN line using customer premises equipment (CPE) carrying out gateway functions.

A further object is to interconnect personal computer local area networks (PCLANs) and the ISDN line for very high rate of file transfer to or from a remote location.

A still further object of the invention is to carry out communications between computers on different local area networks transparently over an ISDN line, i.e., so that no difference between accessing local or remote data is visible to the user.

Another object of the invention is to connect personal computers on different local area networks to the ISDN line, enabling users to access the line while using resident software applications.

Still another object is to connect remote personal computers to local area networks of personal computers over an ISDN line.

A further object is to enable personal computers on at least one local area network to transfer data over an ISDN line using standard communications software.

The above and other objects are satisfied in accordance with one aspect of the invention by a gateway provided at the customer premises, translating protocols used on dissimilar networks and carrying out other network interfacing functions. In accordance with a preferred embodiment of the invention, the gateway comprises one or more circuit modules (ISDN LINE CARD, SYSTEM MASTER CARD, etc.) resident with each local area network, connecting the network to the ISDN line. The circuit module (ISDN LINE CARD) includes means for performing protocol conversion of data flowing between the network and ISDN line through the gateway, means for establishing input and output destination queues, means for measuring traffic flow at each input and output destination queue during a particular time interval, and means for dynamically allocating channels on the ISDN line in response to traffic.

In accordance with a first embodiment (LI/B), a bridger type gateway connects LANs of the same kind, as long as the nodes of all LANs already have unique addresses. Each pair of gateways across the ISDN emulates a MAC layer intelligent "bridge" between LANs. In a second embodiment (LI/R), LANs of different physical and data link layers are connected. Each pair of gateways across the ISDN emulates a network layer "router" between networks.

Preferably, the circuit module includes a system master (SYSTEM MASTER CARD) for managing the configuration of the gateway and for accessing other gateways on the ISDN line. A communication mode adaptor (CMA) incorporated in the module provides dial-up protocols, and an ISDN manager receives and routes incoming data, setting up, selectively, circuit switched and virtual circuit calls and incorporating the aforementioned dynamic channel allocation functions. In the preferred embodiment, the circuit module further includes an ISDN device driver and a configuration control manager storing a table of gateway operating parameters.

In accordance with another aspect of the invention, dynamic channel allocation includes long term channel allocation means for allocating or deallocating transmission channels to a particular destination on the line depending upon data flow traffic to that destination and upon particular channel parameters, and short term channel allocation means. The short term channel allocation means overrides the long term channel allocation means in response to predetermined conditions for allocating or deallocating transmission channels on the ISDN line.

In accordance with a further aspect of the invention, the data is arranged in packets, and the module includes means for assembling pluralities of the packets into trains, each consisting of a predetermined number of packets, for transmission on the ISDN line. Preferably, the trains are compressed prior to transmission to improve bandwidth utilization.

Still other objects and advantages of the present invention will become readily apparent to those skilled in this art from the following detailed description, wherein only the preferred embodiment of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

Best Mode for Practicing the Invention

1. Overview

Figure 1:
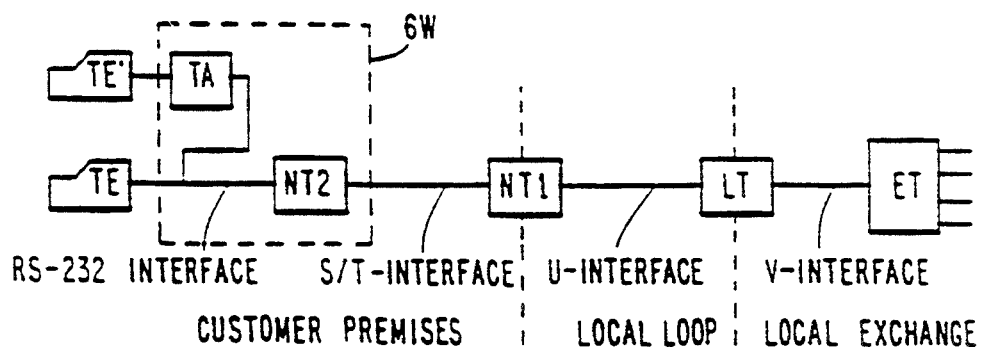
FIG. 1 is a simplified circuit diagram of an Integrated Services Digital Network.
Figure 2:
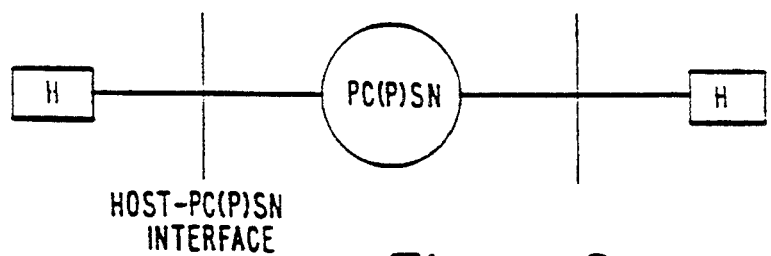
FIG. 2 is a symbolic diagram showing a conventional public circuit or packet switched network.
Figure 3:
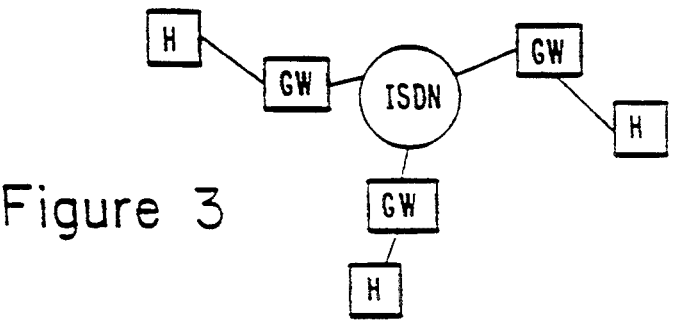
FIG. 3 is a symbolic diagram showing connecting of personal computer local area networks to ISDN lines through ISDN gateways in accordance with one aspect of the invention.

An ISDN gateway for local area networks comprises at least one circuit board resident in each computer for carrying out protocol conversion and other network interface functions. One gateway system enables any local area network so equipped with gateways GW to be connected to an ISDN line, as shown in FIG. 3. Any computer on either of the two LANs shown is in communication with, and shares resources of, any computer on the other LAN. Another gateway system, shown in FIG. 4, enables a remote computer H to be connected to a local area network of computers through the ISDN using a gateway GW2 of the present invention and another type of gateway GW1 connecting a personal computer to the ISDN. The computer connect gateway GW1 is described in detail in copending application Ser. No. 08/094,144, to Gagliardi, et al., entitled "ISDN Interfacing of Personal Computers", filed on even date herewith and assigned to the assignee of the present invention.

Figure 19:
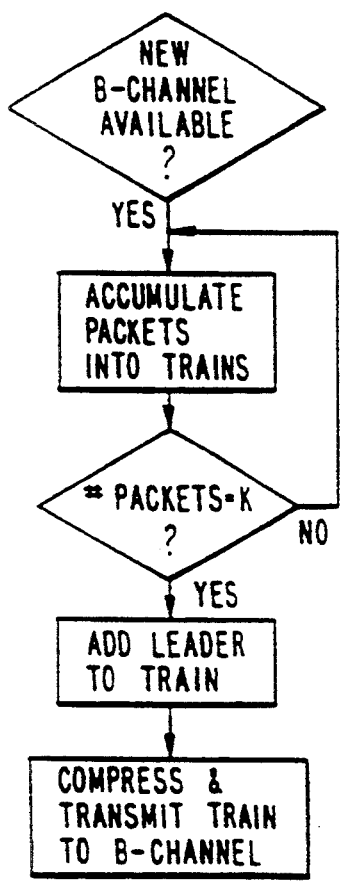
FIG. 19 is a flow chart describing assembly and compression of packet trains for transmission to a new B-channel.
Figure 20:
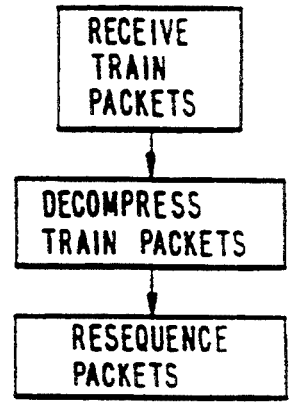
FIG. 20 is a flow chart showing decompression and resequencing of packets.
Figure 22:
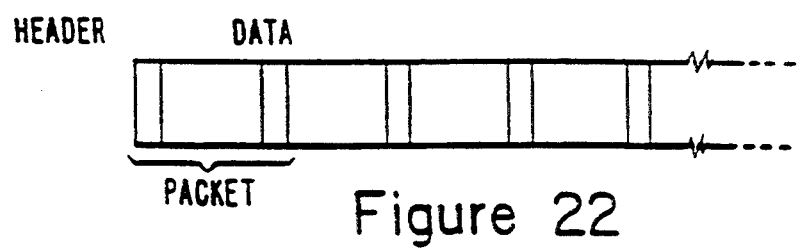
FIG. 22 depicts a train of packets in accordance with a further aspect of the invention.

To improve bandwidth utilization of the ISDN line while transferring voice or data, a B-channel allocation algorithm executed by the gateway, as described in FIGS. 14–17 dynamically allocates bandwidth by monitoring traffic at each destination queue and responsively allocating or deallocating virtual B-channels. Bandwidth utilization is optimized by packaging data packets into trains, shown in FIG. 22, that are transmitted to a destination when the train is completed and upon satisfaction of other conditions. Each train undergoes data compression by execution of a suitable compression algorithm shown in FIG. 19 followed by restoration in accordance with an algorithm of FIG. 20.

2. Network Architecture

A. Stack Protocol

Figure 4:
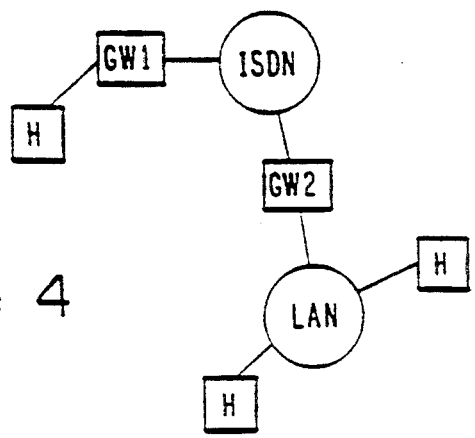
FIG. 4 is a symbolic diagram showing connection of a remote host to an existing local area network through two different types of gateways, in accordance with another aspect of the invention.

The principal characteristics of the ISDN gateway GW shown in FIG. 3 and GW2 shown in FIG. 4 are to connect local area networks to the ISDN to enable the network to become "on line" with a remote computer or another local area network. Two embodiments of the gateway, in accordance with the invention, are a bridger-type gateway and a router-type gateway providing bridger and router gateway services. The type of gateway implemented in each application depends upon the type of signaling information used by the gateway to make ISDN connections.

A bridge-type LAN gateway connects existing disconnected local area networks of the same kind, as long as each node has a unique address. Each pair of gateways across ISDN emulates a MAC layer intelligent "bridge" between networks, as shown in FIG. 10(a).

A router-type LAN gateway connects existing disconnected local area networks with possibility different physical and data link layers. Each pair of gateways across ISDN emulates a network layer "router" between networks, shown in FIG. 10(b). Impact upon host software can be classified as follows.

In a first category, some internetwork protocol layer is presumed already to exist in the newly connected local area networks, and is unique across the networks. In a second category, no new internetwork protocol exists. In this case, the host protocol stack may have to be modified for conformity.

Figure 10A:
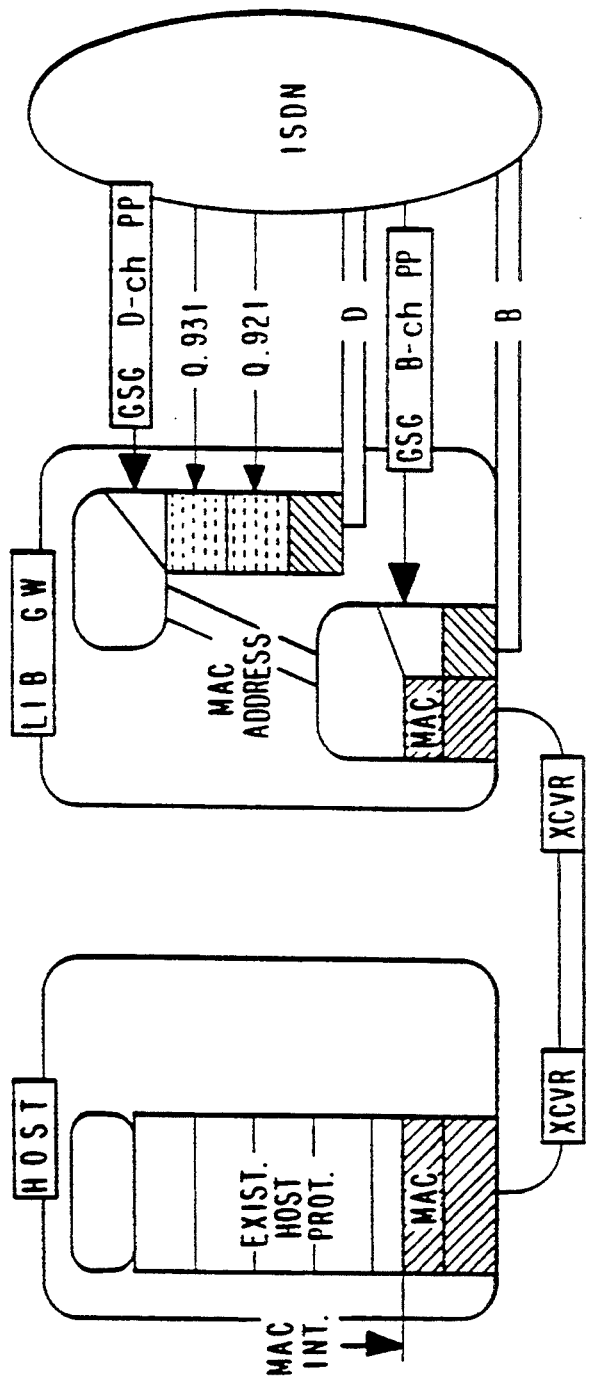
FIGS. 10(a), 10(b) and 10(c) are symbolic diagrams showing architectures of the ISDN gateway in accordance with first and second embodiments of the invention.
Figure 10B:
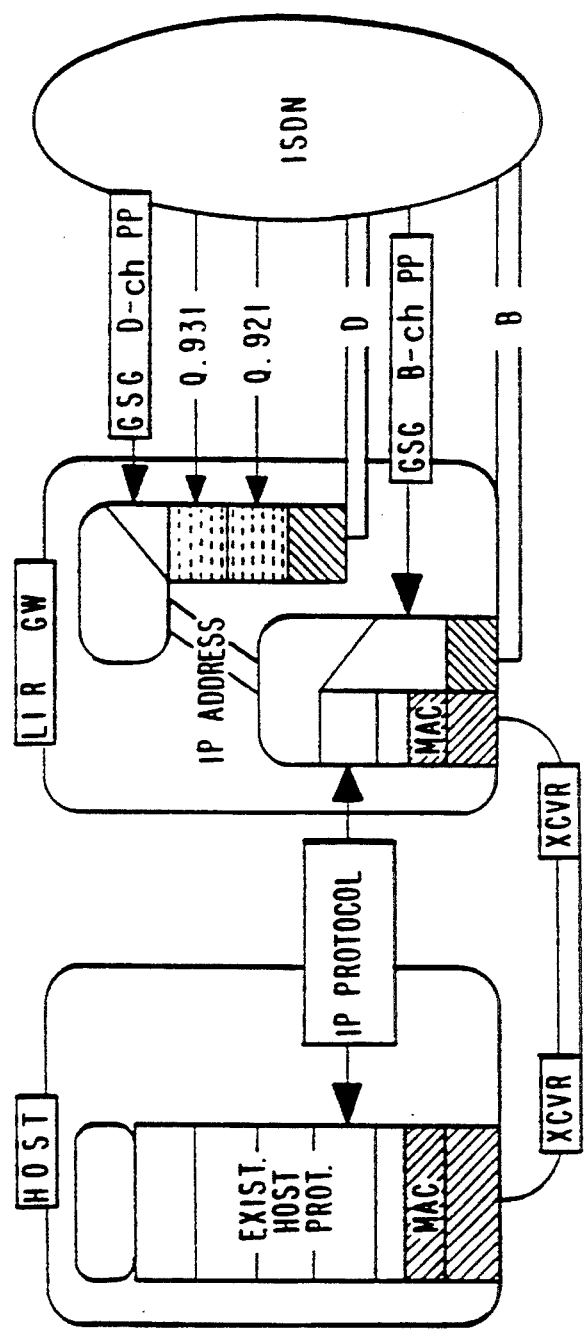

FIGS. 10(a) and 10(b) present protocol stacks for both categories. All LAN gateways are real nodes in the LAN they connect to ISDN. In all gateways, the physical connection to the LAN is a standard link consisting, e.g., of an Ethernet or a transceiver cable and a transceiver. In FIG. 10(a), protocol stacks needed for communication are presented on the assumption that all LAN to be connected by ISDN are of the same type and that all nodes already have unique names. This requirement is implicit when using, e.g., token ring global addressing. User data are handled by protocol stacks in the host that do not require any modification to be connected to ISDN through the LAN gateway. Each pair of LAN gateways of the type shown in FIG. 10(a) across ISDN implements a MAC layer bridge between the two LANs. Each gateway forwards the MAC data packets to the B-channel.

Signaling information for a connection to the remote host is derived by the gateway from the MAC layer address, as shown in FIG. 10(a), and translated into standard ISDN set-up operations. These operations are defined by CCITT recommendations Q.921 (LAPD or D-channel protocol lev.2) and Q.931 (D-channel protocol lev.3) and D-channel pair protocol.

In FIG. 10(b), protocol stacks needed for communication in the router-type gateway, for both categories (1) and (2), are presented. The local area networks to be connected by ISDN do not have to be of the same type but a unique internet protocol should exist across all of them. If not, another interconnect protocol must be added to all nodes of the local area networks to be interconnected by gateways. For category (1), user data are handled by protocol stacks in the hosts that require no modifications to be connected to ISDN through the gateway. For category (2), the protocol stacks in the hosts will be modified to insert the necessary internet protocol layer. In both categories, each pair of gateways shown in FIG. 10(b) across ISDN implements a network layer router between the two LANs. Each gateway forwards the IP data packets to the B-channel.

Signaling information for a connection to the remote host is derived by router-type gateways, FIG. 10(b), from the IP layer address, and translated into the standard ISDN set-up operations.

Figure 10C:
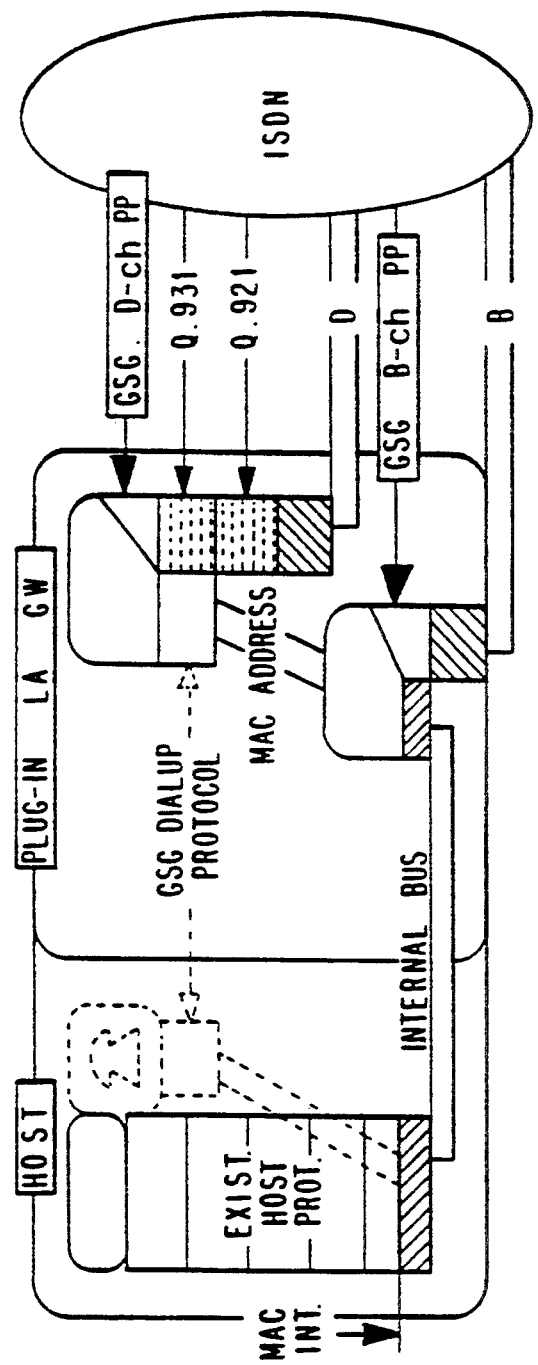

FIG. 10(c) depicts architecture for connecting a single host node to a remote LAN through ISDN, as shown symbolically in FIG. 4, with a host gateway GW1 interconnecting host H and ISDN and a gateway GW2 interconnecting LAN and ISDN. Details of GW1 are described in the previously noted co-pending Gagliardi application entitled "ISDN Interfacing of Personal Computers", incorporated herein by reference.

The protocol stack for GW2 in FIG. 4 is the same as shown in FIG. 10(a), describing bridger-type gateway protocol. The stack shown in FIG. 10(c) emulates a MAC-like interface to the upper protocol layers. Selection of the remote LAN is made through signaling information passed by the host to the GW1 software.

User data are handled by protocol stacks in the hosts, implemented by conventional communication software packages. Host data protocol stacks simply provide a MAC layer protocol conversion from the internal bus connection to the B-channel and add peer protocol. Signaling information is generated by host software to setup the host connection. Signaling protocol between host H and the gateway GW1 is shown in FIG. 10(c) by the arrow labeled "dialup protocol". The signaling protocol stack in GW1 translates requests from the host into standard ISDN set-up operations.

B. Hardware

Figure 5:
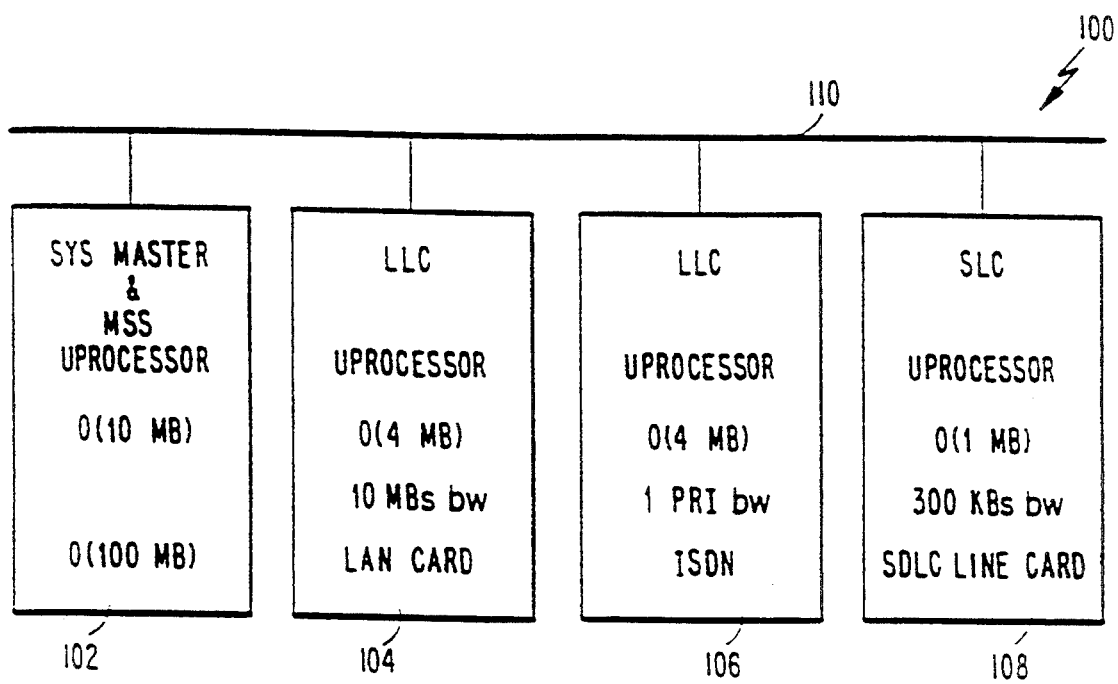
FIG. 5 is a simplified block diagram showing hardware architecture of an ISDN gateway at the customer premises in accordance with the invention.

Referring to FIG. 5, an ISDN gateway 100 of a type shown in FIGS. 3 and 4, designated as GW and GW2, comprises a "module" having four hardware elements 102, 104, 106, 108 interconnected by a common bus 110. The elements 102–108 preferably comprise individual circuit cards, although some or all of the elements may be incorporated in a single circuit board. The board or boards preferably reside within a personal computer but alternatively may reside outside the computer as an "outboard" module.

Element 102 is a system master which implements infrequent user functions, such as configuration management and connection requests. The system master 102 furthermore functions as a standard computing platform, emulating an IBM compatible PC or other computer standard.

LAN line card 104 implements firmware and hardware for specific IEEE 802 physical and data link protocol together with software carrying out host filtering. Different LAN line cards with corresponding protocols will be required for other LAN connections, e.g., 802.5 Token Ring and 802.3 Ethernet.

ISDN line card 106 comprises firmware and hardware implementing the ISDN physical, data link layer (LAPD), and the D-channel layer 3 protocol, and the physical layer of the B-channel. Software incorporated in the ISDN line card 106 implements train protocol and B-channel allocation algorithms as well as data compression algorithms to support a virtual broad band capability of the gateway, described in copending application No. 07/976,923 to Gagliardi et al., entitled "Dynamic Channel Allocation Method and System for Integrated Services Digital Network". SDLC line card 108 includes firmware and hardware to implement the SNA physical and data link (SDLC) layers. This card is optional to the Network.

3. Software Architecture

Figure 6:
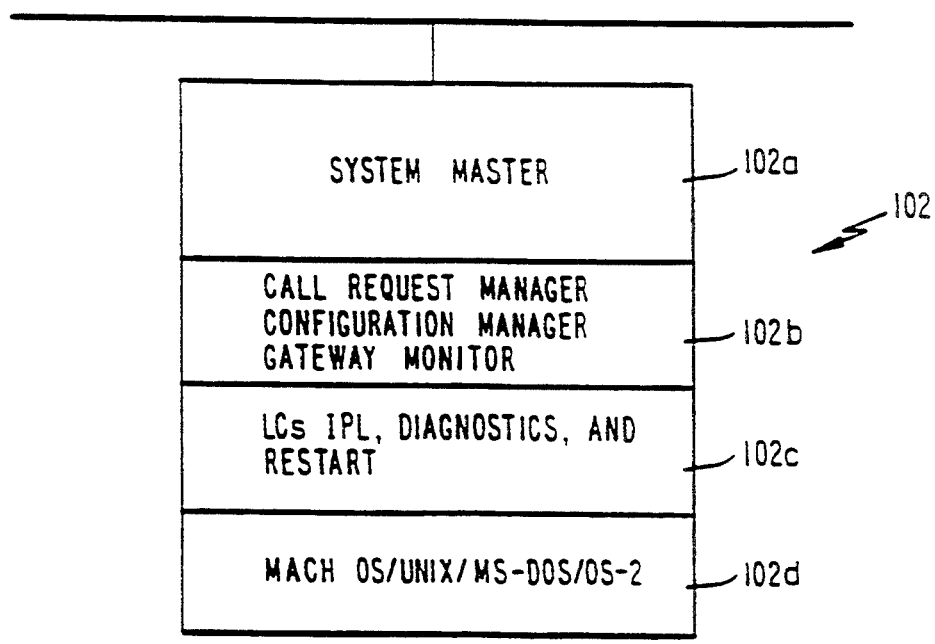
FIG. 6 is a diagram of software architecture incorporated in the system master card shown in FIG. 5.

The software architecture of system master element 102, shown in FIG. 6, is configured with three layers of software underlying the system master 102(a) in a stack. The underlying layers comprise call request management, configuration management and monitoring layer 102(b), as well as layers 102(c), 102(d) for implementing a computing platform.

Figure 7:
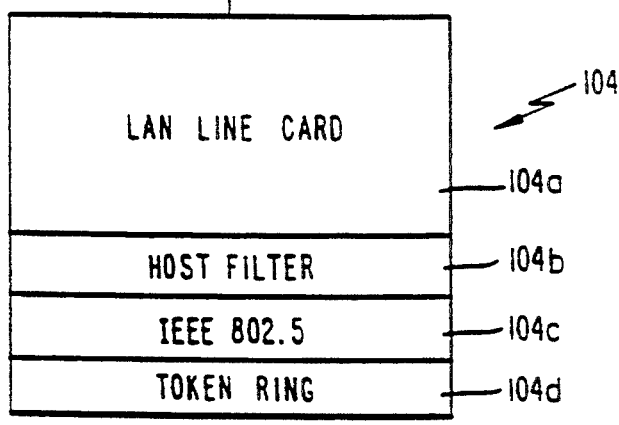
FIG. 7 is a diagram of software architecture showing a LAN line card of FIG. 5.

In FIG. 7, the software architecture of one embodiment of a LAN line card (LLC) 104 for 802.5 Token Ring comprises a functional layer 104(a) together with a layer 104(b) comprising a host filter, receiving and selectively processing packets addressed to the host. Underlying layers 104(c), 104(d) in this example implement the specific IEEE 802 physical and data link protocol (802.5) for Token Ring.

Figure 8:
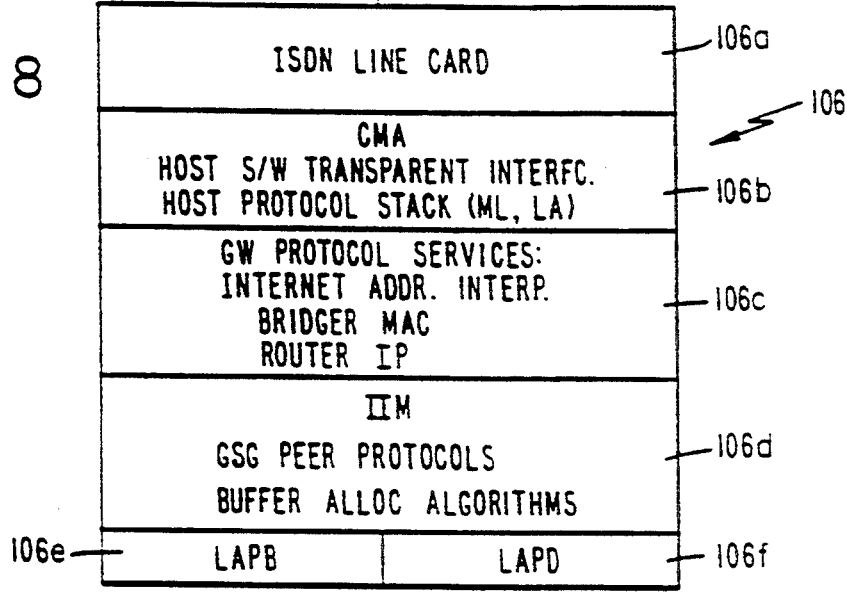
FIG. 8 is a diagram showing software architecture incorporated in an ISDN line card shown in FIG. 5.

In FIG. 8, the software architecture of the ISDN line card 106 comprises a functional layer 106(a), together with underlying layers 106(b)–106(f) for carrying out the requirements of the OSI Reference Model layers associated with ISDN. These layers include a communication mode adapter (CMA) at layer 106(b) and protocol services at layer 106(c). Layer 106(d), IIM, carries out gateway peer protocol and executes buffer allocation algorithms to be described in detail later. Peer protocols, applied on B-channels used by the gateway to implement train packing, compression and error handling, are also described later.

Figure 9:
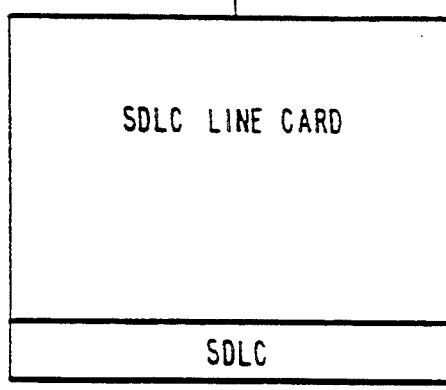
FIG. 9 is a diagram of software architecture incorporated in the SDLC line card shown in FIG. 5.

FIG. 9 depicts software architecture of the SDLC line card implementing the SNA physical and data link layers for carrying out inter-networking among hosts.

Figure 11A:
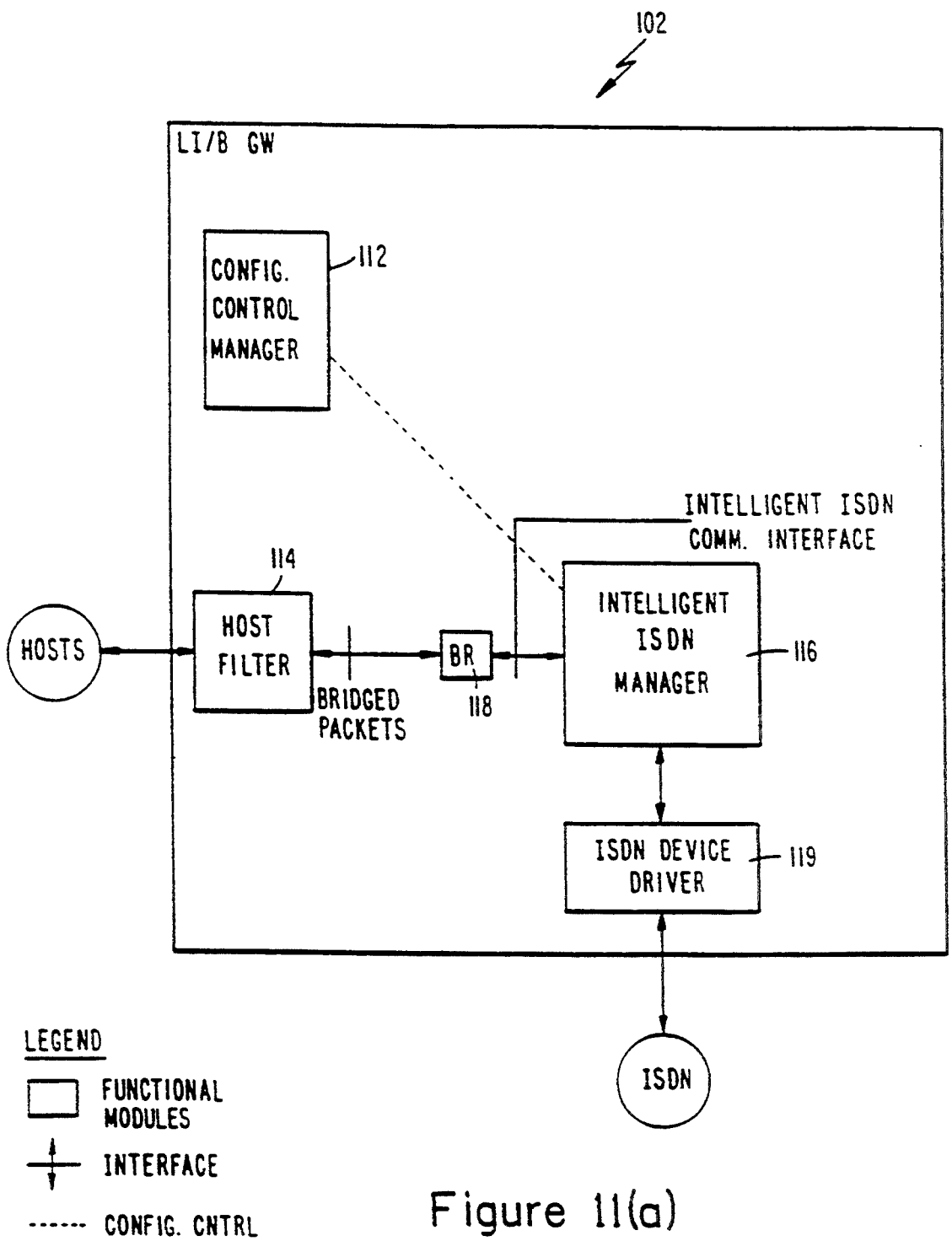
FIG. 11(a) and 11(b) are diagrams showing mapping of software to hardware components within the ISDN gateway in accordance with the first and second embodiments.
Figure 11B:
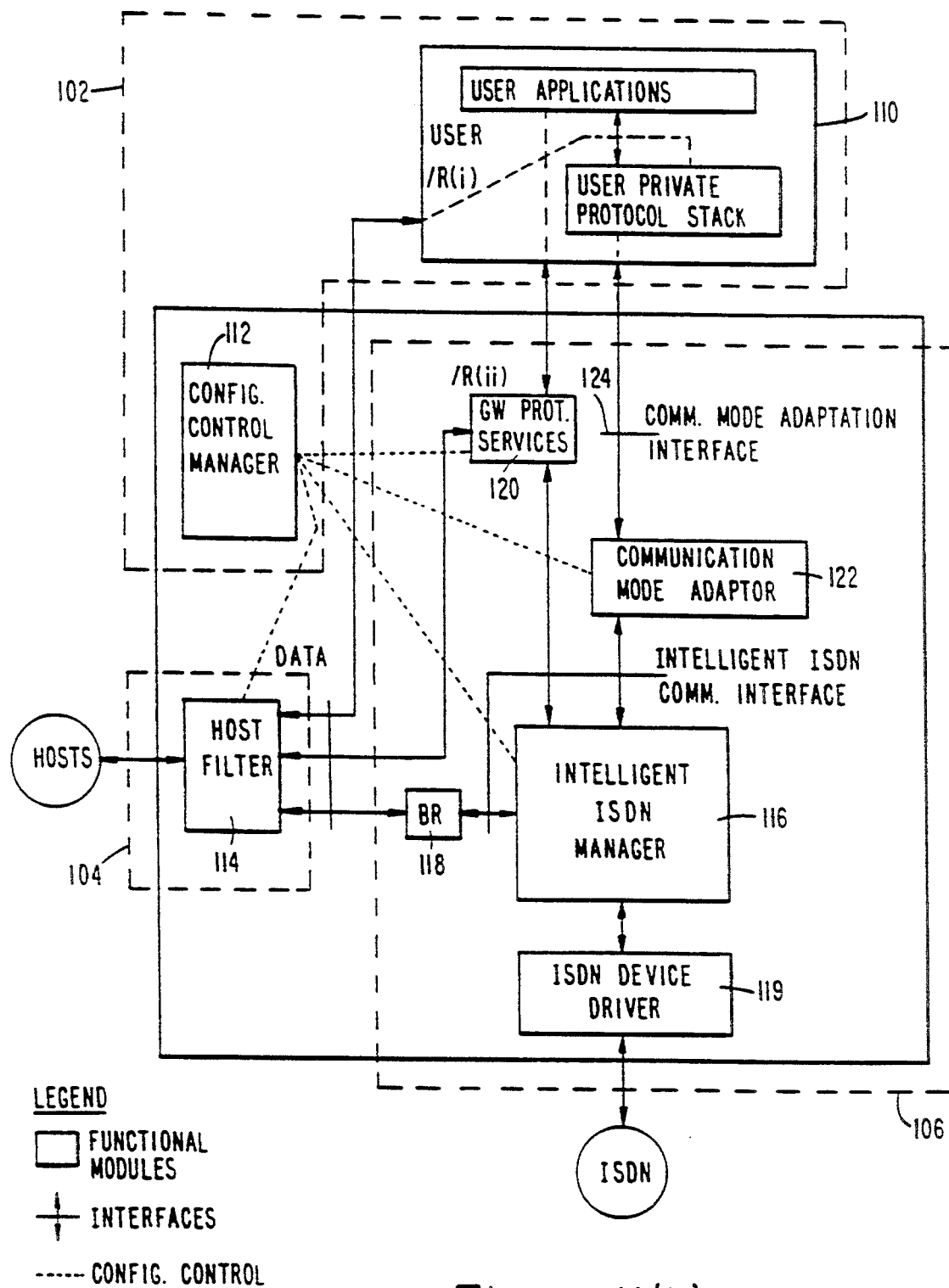

Mapping of software shown in FIGS. 6–9 to hardware components of FIG. 5 is symbolized in FIGS. 11(a) and 11(b). Referring first to FIG. 11(b), router-type LAN gateway, within the system master card 102, a USER software module 110 supports user application software and protocol stack, residing at layer 7 of the OSI Reference Model. Configuration control manager 112 of the system master monitors bandwidth allocation and errors. The system master 102 specifically manages configuration of the gateway, providing status, billing and information tracing on the use of resources in the gateway, as well as access to internal tables used by routing gateway services. Also provided by the system master are network management services and remote access to other system masters in the same interconnected network.

Functions carried out by the system master 102 include updating of records, loaded on disk into memory resident data structures when the system is initiated. When these tables are updated, the disk is automatically updated as well.

Configuration control manager 112 controls parameters which define the resources available to the gateway and the access privileges to the system master 102. A connection request manager, incorporated in 112, defines how the gateway relates to other gateways for implementing gateway functions to a personal computer.

Configuration control manager 112 further maintains a configuration table for parameters controlling the operation of the gateway. The table, implemented in software, defines the ISDN configuration including number of channels allocated to the gateway, characteristics of the channels and all directory numbers associated with the gateway. Furthermore stored are characteristics of the types of interconnections of the host side of the network, e.g., RS-232, DMA, etc., and default parameters for incoming calls, e.g., select all non-collect calls, allow collect calls with proper user information and collect calls only from particular numbers. Level of system monitoring, also retained by the control configuration manager tables, controls available options and enables the amount of overhead associated with those options to be limited. Password information for access to the gateway and user profiles determining what kind of activities are allowed to a given user or a class of users also are retained in the manager tables.

A connection request manager (not shown), included in module 112, controls a table containing information required to set up a B-channel or remote gateway. This information includes at least one remote ISDN number for the connection and any user information required in the layer 3 set-up message. For LAN interconnections, the connection request table defines the interconnected LAN. During operation of the gateway, this table also records whether the connection is established and provides a handle for the connection which can be used to direct packets to a destination manager.

Configuration control manager 112 additionally collects statistics for B-channels, including channel utilization including a statistical sampling to determine the percentage of idle capacity on the channel, possibly on a per-connection basis. Since each channel is bi-directional, measurement takes place both on the outgoing and incoming lines. Information also is maintained on any delay for packets in the system, as well as on the "high water mark" in the buffer pool for a given destination and the number of buffers discarded for a destination due to memory constraints. For channels that are connected, the percentage of frames sent or received in errors will also be recorded for use, among other ways to determine the type of data link protocol applied to a given destination.

Use of the gateway by nodes of an LAN is monitored by a system administrator (not shown) which records the amount of data sent or received by a node on a per-cargo destination basis, the number of connections initiated due to packets of a given node, and the arrival rate of packets from a particular node. The system administrator further may monitor broadcast or multi-cast transmissions by a particular node, and the number of times a node is not found in tabulated data. To reduce overhead, the system administrator restricts monitoring to traffic from specific nodes or uses statistical sampling of all traffic in the gateway.

Whereas the system master card 102 performs the necessary configuration and reconfiguration functions for supporting gateway operations carried out by intelligent ISDN manager (IIM) 116 in ISDN line card 106, LAN card 104 comprises principally a host filter 114. Upon arrival of a packet from another host within a local LAN, the host filter 114 examines the link-level address of the packet. If the packet is addressed to a local host other than the gateway, the packet is discarded. If the packet is addressed to remote hosts covered by a bridging service, it is passed to bridger 118 implemented in ISDN line card 106. If the packet is addressed to the gateway, and the packet indicates a service access point of the gateway protocol services, then it is passed to gateway services module 120. Finally, if the packet is addressed to the gateway, and the packet type is not recognized to be any of the service access points of the gateway protocol services, then it is passed to user module 110 in system master card 102 (LI/B).

More specifically, if the packet is passed to the bridger 118, the packet is intended to be bridges over to another local area network. The link-level address resolved by the bridged 118 using pre-configured tables. On the other hand, if the packet is passed to gateway services module 120, for category (2), the packet is intended to be processed by some gateway protocol service programs analogous to those in the user private protocol stack in user module 110. The services provided are those commonly associated with the network or inter-network layer of communication protocols, including name and address resolution and some limited form of routing. An example is a simplified re-implementation of the network layer of an existing communication protocol. These service programs in turn interact with the IIM 116 to pass data to remote hosts.

A packet passed to the user module 110, in category (1), is meant to be handled by some application or protocol software resident on the same node as the gateway. An example of such a program is a private protocol router. The user module 110 of system master card 102 interfaces with communication mode adapter (CMA) 122 of the ISDN line card 104 through a communication mode adaptor interface 124. The CMA 122 provides various adaptation modules allowing the user module 110 to interface with destinations, such as a user modem, leased lines or virtual circuit telemetry which adapts existing USER software and interacts with public or private data networks that support virtual circuits.

Figure 12:
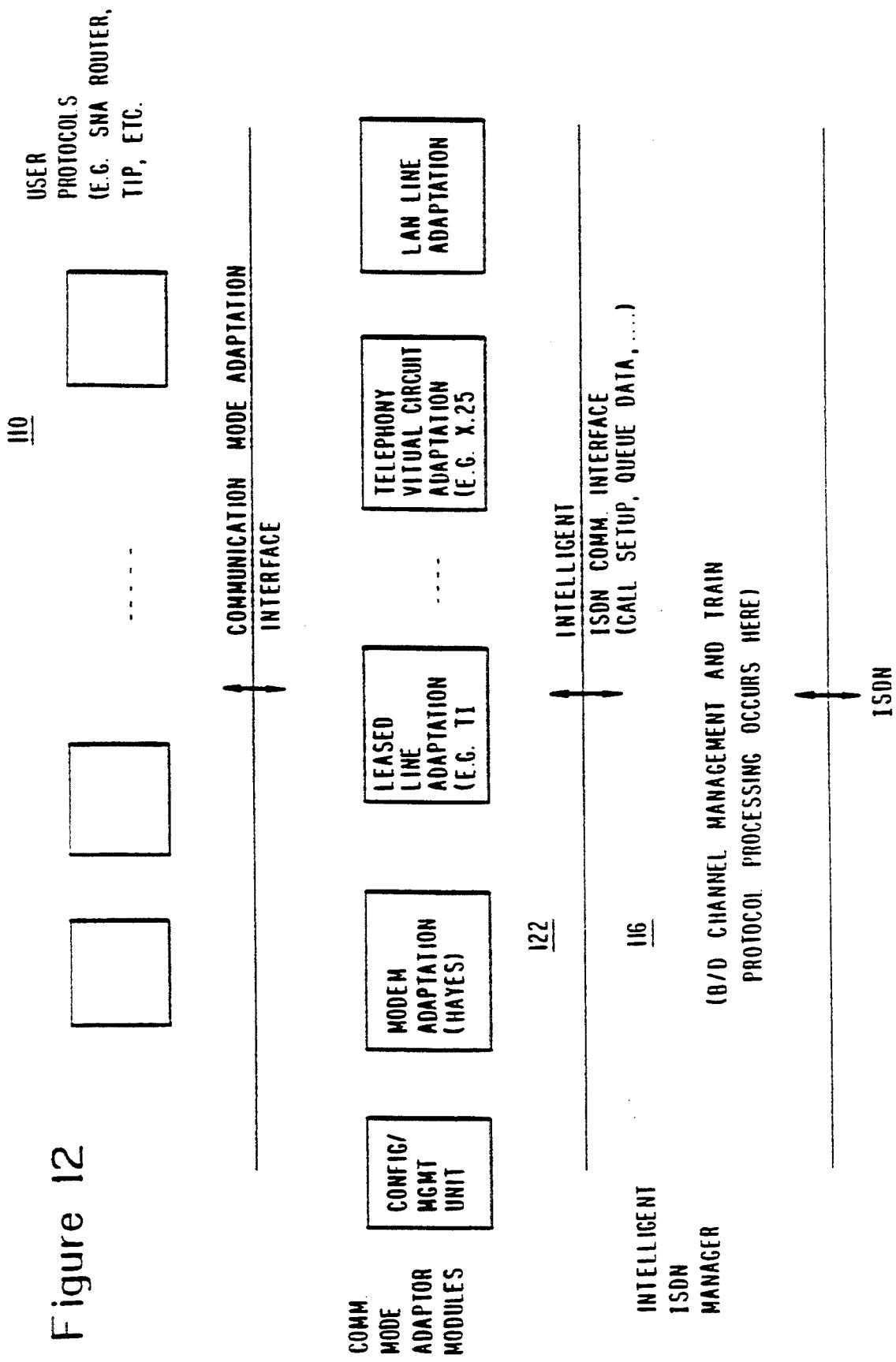
FIG. 12 is a diagram showing operation hierarchy in the ISDN line card shown in FIGS. 11(a) and 11(b).

The architecture of the CMA 122 is depicted symbolically in FIG. 12. The gateway services module 120 of FIG. 11(b) provides router functions for private protocol stacks. Name and address resolutions are performed at the user module 110, incorporating existing software of the private protocol stacks or one performed within gateway services module 120. In the latter case, the gateway services module 120 can be performed of at an existing private network/internetwork protocol stack, re-implemented as required for particular applications.

The intelligent ISDN manager (IIM) 116 receives packets of data and commands to set up virtual circuits. The IIM 116 implements train packaging and B-channel allocation as well as data compression, forming important aspects of the invention. The content and operation of IIM 116 shall be described in detail hereinafter.

Bridger 118 in FIG. 11(b) operates at the 802 medium access (MAC) layer between LANs or single nodes. This module is used to create a much larger "virtual LAN" out of an arbitrary number of LANs and single nodes. An 802 MAC level bridge as a method to interconnect level 2 networks in this regard is particularly advantageous for several reasons. First, providing a connection at the MAC level ensures that all higher level protocols available across connected LANs will continue to work in a virtual LAN with no modification, and that network applications based on these higher level protocols will also operate in the same manner. A bridge in this respect supports many types of network systems on different LANs.

Furthermore, once the bridge has determined that a remote conversation is underway, forwarding of remote 802 packets is achieved on the order of 100 instructions, whereas network level routing generally requires on the order of several thousand instructions. This means that bridges in general can handle an order of magnitude more packets using the same processing power.

Finally, MAC level bridges operate in a connectionless mode and depend on high quality transmission lines to minimize retransmissions controlled by higher level protocols on an end-to-end basis. Network routers tend to require much more overhead, because they operate in connection mode and in view of to the number of control messages required to allow for a dynamic routing. Given the disparity between ISDN bandwidth and LAN bandwidths, the ability to minimize the overhead needed to manage the LAN connection is considerable.

Peer protocol implemented by IIM 116 ensures that data packets arrive to the remote gateway in the same order as they were received by the local gateway. Peer protocol provides a transport level surface to sequence all packets for this purpose. Interfacing between the IIM 116 and ISDN is carried out through an ISDN device driver 119.

The bridge-type LAN gateway shown in FIG. 11(a) comprises only the configuration control manager 112, host filter 114, ISDN manager 116, bridger 118, and driver 119. The remaining modules of FIG. 11(b) are unnecessary, as the higher level router functions of the gateway are not utilized for bridge services.

5. Dynamic Bandwidth Allocation

A further aspect of the invention involves improving bandwidth utilization of the ISDN line while using gateway features. A B-channel allocation algorithm executed by gateways between terminals and the ISDN line dynamically allocates channel by monitoring traffic at each destination queue, shown in FIG. 13, and responsively allocating or deallocating virtual B-channels. Bandwidth utilization is optimized by packaging data packets into trains that are transmitted to the destination when the train is completed and upon satisfaction of other conditions. Each train undergoes data compression by execution of suitable compression and correction algorithms.

More specifically, B-channel allocation, implemented by an allocation algorithm to maximize utilization of the channels, minimizes response times and the probability of losing data packets due to buffer overflow. The channel allocation algorithm, residing within the B-channel manager of IIM 116 (FIG. 13), includes commands to establish user-level connections to destinations and to send and receive data. Data passed to the IIM 116 is queued in destination queues. The channel allocation algorithm monitors the status of the destination queues, and dynamically allocates ISDN channel bandwidth to these queues. The following definitions support the channel allocation algorithm.

A "destination", which is a connection at the router level, typically coincides with a physical router. If peer protocol is compatible, all user-level connections of various types, such as virtual circuit, modem connections, LAN, packets, etc., can multiplex within the same router connection. If the peer routers are incompatible, multiple router-level connections to a single physical gateway are necessary.

Associated with each destination is a "destination queue", denoted as Q(d), consisting of a pool of buffers. The pool of buffers for destination d comprises the messages destined for d. The number of buffers in Q(d) is denoted as b(d); it is assumed that B-channels output from or input to a buffer in parallel, with each buffer having a fixed maximum size.

A number of B-channels currently allocated to a destination d is denoted as B(d). If a queue Q(d) becomes too long relative to the number of channels allocated to d, an extra channel is allocated. On the other hand, if Q(d) is relatively short compared to the size of B(d), some channels are released. If no buffers are available for accumulation of a new train at a destination d, a "buffer fault" is created.

Events that define the length of a packet train trigger the invocation of the buffer allocation algorithm these events comprise packet arrivals at ISDN line card 106 for transmission to the public network. There are four conditions that must be considered:

1. If a destination d is known, and Q(d) contains an "open" buffer, that is, a buffer that is not filled to the maximum length, the packet is accumulated into the train.

2. If the destination d is known, but no "open" buffer is available in Q(d), a new buffer is created and a new train is started.

3. If the destination d is known, but an "open" buffer is about to fill up, the packet is accumulated in the current open buffer. Thereafter, the buffer is closed to seal the train.

4. If destination d is unknown, a new buffer pool is started for a new train.

The channel allocation algorithm operates asynchronously to the buffer allocation algorithm described previously. As one important aspect of the invention, the channel allocation algorithm is partitioned into two components, long term allocation and short term allocation.

6. Long Term Channel Allocation

Long term allocation, LTA, monitors the recent historical track pattern to and from a destination, and decides upon the bandwidth and types of channels to be allocated to that destination. Short term allocation, STA, monitors the current size of the destination queues and the aging constraints of these queues, and decides whether to deviate, temporarily, from decisions of the long term allocation algorithm. This enables response to situations that are not well-handled by long term allocation, e.g., situations arising due to a temporary or sudden surge of traffic to certain destinations not predicted based on the long term allocation algorithm. Decisions on bandwidth allocation produced by the long term and short term allocation algorithms preferably are stored in charged memory, and are carried out at convenient intervals by ISDN channel processes to be described later.

Channel allocation is described herein for B-channels, although similar allocation can be carried out for D-channels as well. In general, B-channels can be used in a circuit switched mode or in a packet switched mode using data formats show in FIG. 21(a) and 21(b). The circuit switched mode preferably is used only to transmit data between low-traffic destinations in view of the relatively high set-up/tear down overhead required. The packet switched mode is preferable for transmission to destinations with a low-traffic rate if there is a moderate response time requirement. For destinations that require higher traffic rate or have more stringent response time requirements, use of B-channels in the circuit switched mode is preferable. For destinations that do not have high traffic rate but have very stringent response time requirements, the B-channels should be dedicated in the circuit switched mode and deliberately underutilized.

Figure 14:
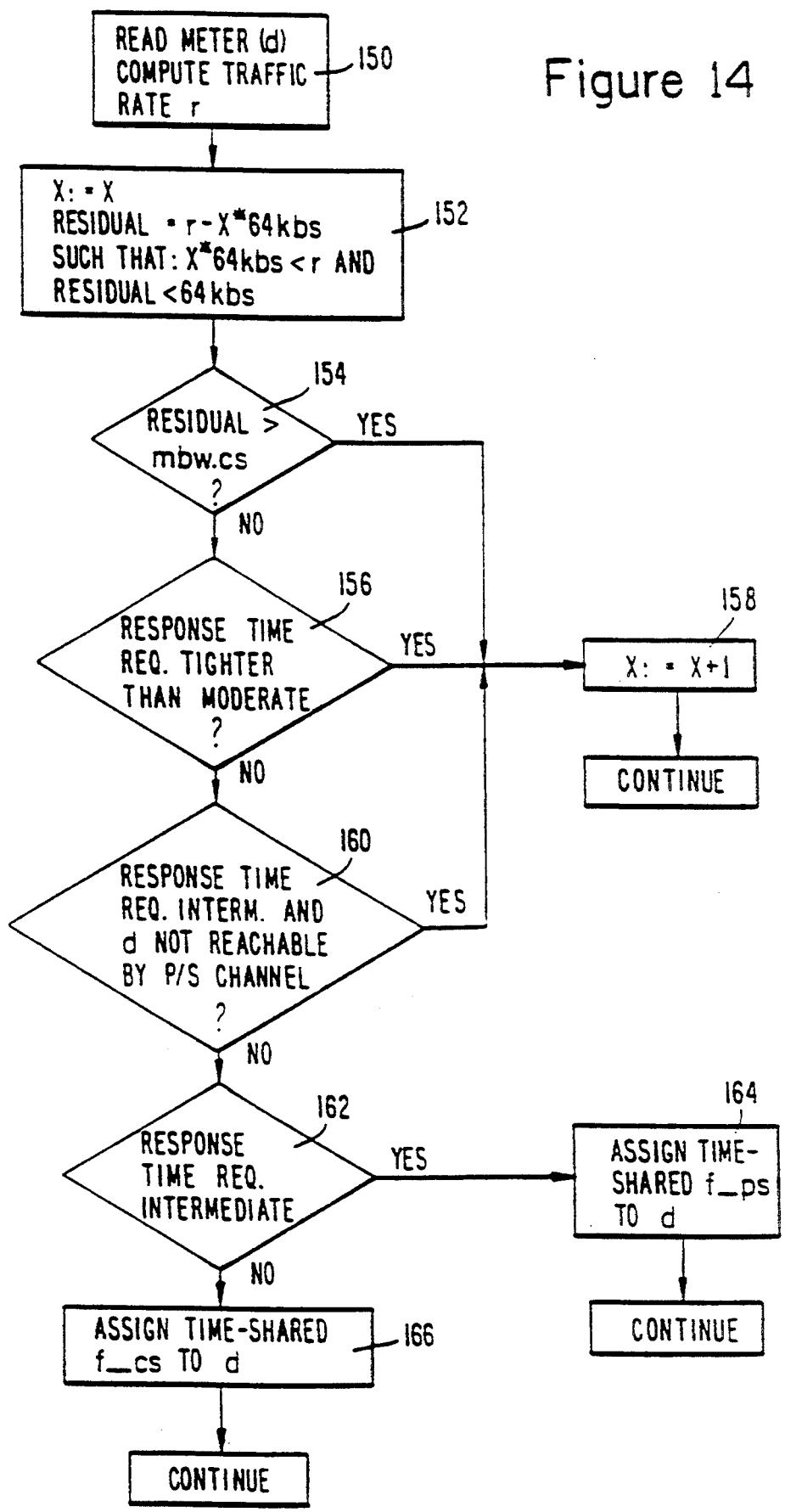
FIG. 14 is a flow chart of algorithms for carrying out LTA channel allocation in accordance with an aspect of the invention.

The LTA algorithm is summarized in the flow chart of FIG. 14. The traffic rate R at each destination is monitored by a software flowmeter, which may be a counter of data quantity arriving at the destination queue within a particular interval of time. Each software flowmeter is polled at fixed intervals (w). The flowmeter is read, then reset, and the reading is used by the LTA to determine how many B-channels are to be allocated to that destination.

One embodiment of a LTA algorithm LTA, in accordance with the invention, is as follows. Referring to FIG. 14, step 150 reads a traffic rate R for a destination d, wherein R is defined as follows.

$$r = Max\ \{v\_in\ (d,\ t-w,\ t)/w,\ v\_out\ (d,\ t-w,\ t)/w\},$$

where t is the time when the meter is read, v_in(d, t−w, t) is the accumulated input traffic volume for destination d between time t and t−w, and v_out(d, t−w, t) is that for the output queue.

in step 152, an integer x, that is greater than or equal to zero, is found such that $$x\ *\ hbw\_cs \leq r \leq (x+1)\ *\ hbw\_cs$$

and xB channels in circuit switched mode are allocated to destination d, where hbw_cs is the achievable bandwidth once set up for a circuit switched mode B-channel. This number in practice is close to 64 Kbs.

Assuming that residual =r−x * hbw__cs, step 154 determines whether residual is greater than mbw__cs, where mbw__cs is the minimum utilization of a circuit switched B-channel, or whether the response time is more stringent than moderate (step 156). The term "moderate" is defined to be the response time that can be offered by a packet switched channel. If either condition is true, than one more B-channel is allocated to destination d (step 158).

On the other hand, if $0 \leq$ residual $\leq$ mbw__cs and the response time requirement is moderate or more relaxed than moderate, and traffic is suitable for packet switched channels, a fraction of a packet switched channel is allocated to destination d, wherein the fraction f is determined as follows.

ebw__ps=effective bandwidth of a packet switched B channel

In step 160, if destination d is not reachable by packet switched channels, or the packet is not of a nature that is suitably transmitted through packet switched channels, and the response time requirement is very relaxed (step 162), then a fraction of a circuit switched mode channel is allocated to destination d (step 164). The fraction in this example is determined by the size of the residual. The notation used in the adore algorithm is as follows.

x, f: decision variables
t, r, residual: state variables
ebw__ps, hbw__cw: ISDN performance profile
mbw__cs, w: algorithm control parameters response time requirements for packet transmission:
tight: $\leq 260$ ms
moderate: between z seconds and 260ms
very relaxed: $\leq$ =z seconds.

In addition, the algorithm is sensitive to the transmission delay of packet switched channels and the ISDN call set-up and tear down times for circuit switched mode. The former is used to derive a boundary between moderate and height response times. The latter is used to calculate the response times obtainable for time-shared fractional allocation of B-channels in circuit switched modes, which in turn determines the value of z which defines the boundary between moderate and very relaxed response time requirements. The basic logic of the algorithm remains unchanged under different performance profiles.

An important algorithm control parameter is the "meter window" w, which is selected such that the algorithm is sufficiently sensitive to short-term fluctuation in traffic intensity but is not too sensitive. If w is too small, a very short-termed surge in traffic may result in too many B-channels allocated and therefore will incur a high set-up tear down overhead. If w is too large, the algorithm may not be responsive enough to a short term search, resulting in a fast destination queue build-up. An excessive amount of buffer space may be consumed and response time may be degraded.

To attenuate sensitivity, the following method uses weighted averaging of traffic in multiple windows. If a window system w with three windows w1, w2 and w3 is used, with weights wt1, wt2 and wt3, where the sum of wt1−wt3 is unity, traffic rate r can be equated to R(d, t, W,) computed as follows:

$$R(d, W, t) = v(d, t - w1, t)/w1 * wt1 +$$

-continued
$$v(d, t - w1 - w2, t - w1)/w2 * wt2 +$$
$$v(d, t - w1 - w2 - w3, t - w1 - w2)/w3 * wt3$$

With this generalization, to allow the algorithm to be more sensitive to short term fluctuation and less to the long term pattern, wt1 should be increased and wt3 decreased, and vice versa. Multiple counters are maintained for each destination queue using this strategy.

7. Short Term Channel Allocator

The LTA algorithm functions well in cases where there are sufficient B-channels available and decisions made by LTA are feasible. This means that the total number of B-channels allocated by LTA is smaller than the total number of B-channels subscribed, and sufficiently smaller such that the probability that an incoming call request finds all channels busy is very small, and further that the recent past history in fact represents a good basis for allocation. When such conditions are not met, the STA algorithm must be implemented.

In general, STA makes decisions which override, temporarily, decisions made by LTA. Channel processes, described later, implement decisions made by LTA under normal circumstances. When a B-channel is just "freed" from servicing an input and output buffer, the B-channel process checks to see if a decision has been made to deallocate channels from the destination d. If so, it deallocates itself and finds a new destination for which a decision has been made by LTA to have additional channels allocated. However, when unusual conditions are detected, such as a destination queue being ignored for too long, or a B-channel process encountering an empty destination queue, self-adjustment may be performed by the B-channel process to execute decisions rendered by STA. Two examples to which STA responds are (1) if any buffer in the destination queue d is found to exceed an age limit, or (2) if the following quantity exceeds a relative queue size limit:

$$\frac{\sum\limits_{k} T_k(d_i)}{B(d_i)}$$

Where:
T $(d_i)$=size of kth train for k i the ith destination
B $(d_i)$=no. of B-channels i assigned to the ith destination The above relationship is satisfied when the quantity of data in all trains to a particular destination exceeds the number of B-channels assigned to that destination.

Figure 15:
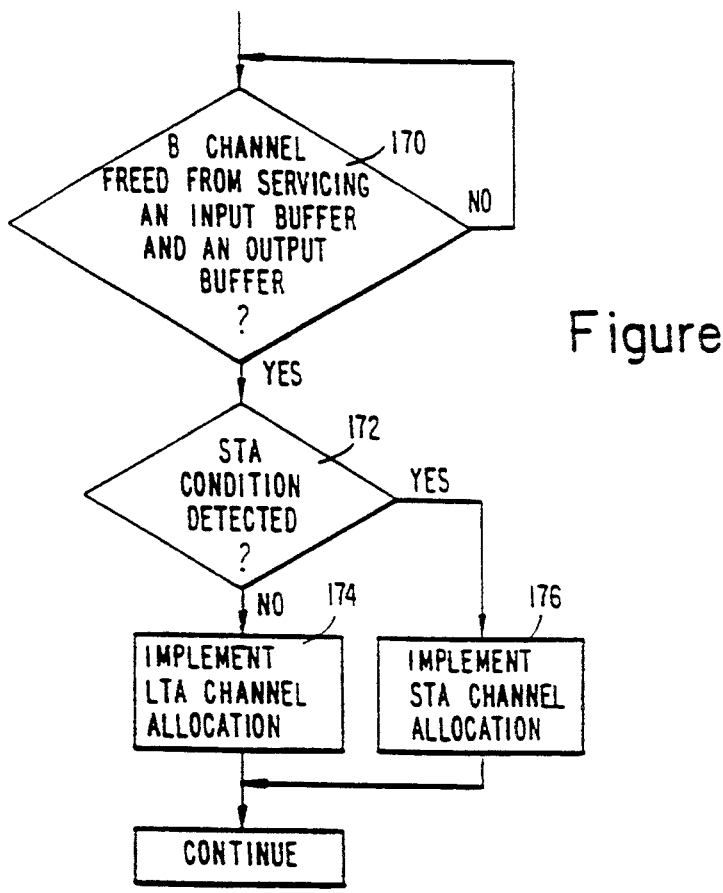
FIG. 15 is a flow chart of algorithms for selecting between LTA and STA channel allocation.

Logic implementing execution of the STA is shown in FIG. 15, wherein step 170 waits until a B-channel is freed from servicing in the input buffer and the output buffer, and then waits for an STA condition, such as the two conditions previously described, to be detected (step 172). LTA is implemented in step 174 unless the STA condition is detected. In response to an STA condition, STA channel allocation is carried out in step 176, and the process continues.

8. B-Channel Processes

Figure 16:
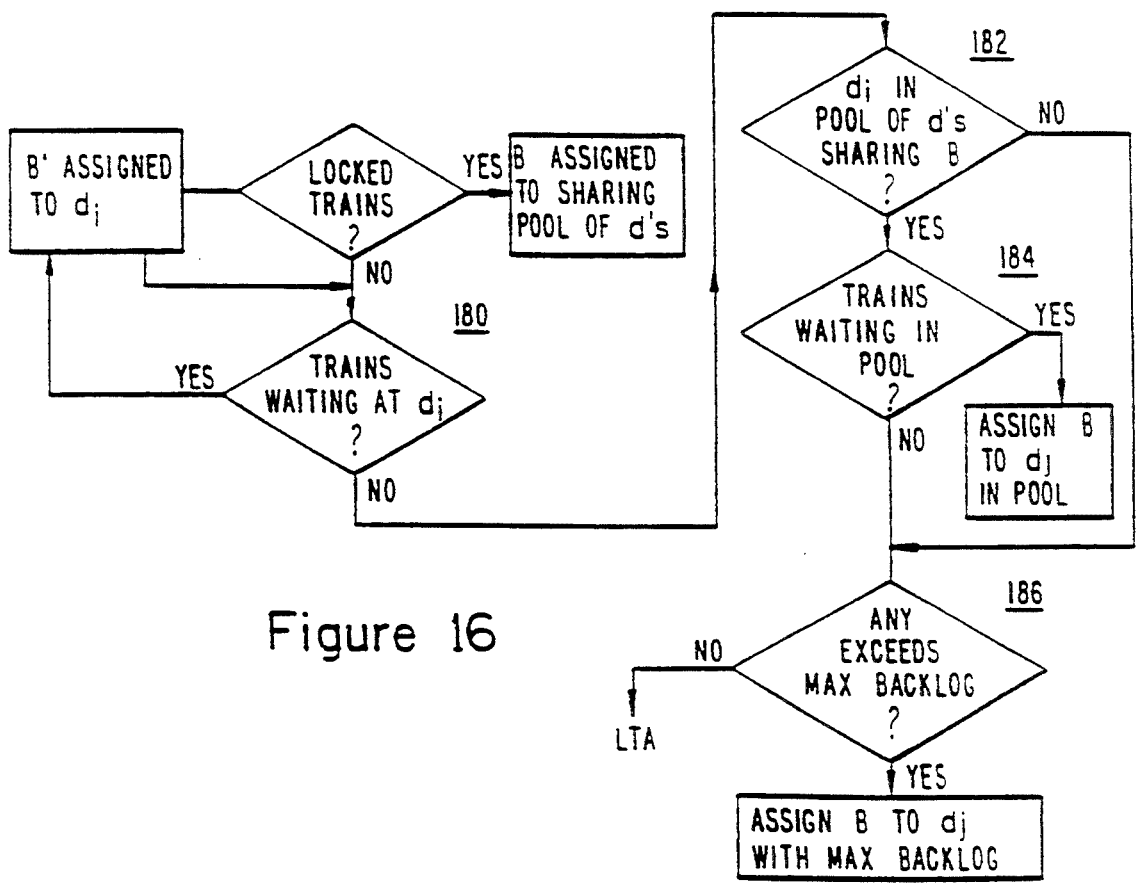
FIG. 16 is a flow chart of channel processes responding to decisions made by both the LTA and STA channel allocation algorithms.

An important aspect of the invention involves the B-channel processes which respond to decisions made by both the LTA and STA. Referring to FIG. 16, channel process invocation is triggered in response to an end of train transmission on any B-channel for input or output traffic. There are three different cases for reallocating a recently freed B-channel to release an emptied buffer to a free buffer pool:

1. The first part of the channel process algorithm prevents locking out trains associated with low traffic rate destinations, or locking out incoming call requests. Executing lockout prevention at the first part of the algorithm eliminates possibility of lockout. Since this part of the algorithm tends to disturb stable allocations of B-channels to high intensity traffic streams, probability of invocation preferably is modulated inversely to the number of B-channels assigned to the destination associated with the just freed B-channel.

The probability of invocation is higher if the B-channel is allocated fractionally to a high number of distinct destinations. Probability of invocation is lower if more B-channels have been allocated to the same destination. In other words, the higher the traffic rate for a destination d, the lower the probability of causing a "wild" deallocation of one of its B-channels to handle of locked out trains.

Sealed trains are time stamped. A check is made by STA over the entire buffer pool for all destinations to see if there are trains whose age exceeds a predetermined age limit. If any are found, absence of B-channels allocated to their destinations are checked to confirm that trains are truly locked out. If such a flag is found, the just freed B-channel is associated to all respective destinations, originating fractional allocations of B-channels, the oldest locked out train is selected and transmitted. A condition wherein the age limit is set at a sufficiently high level, and if overall traffic does not exceed the capacity of the gateway is very rare. This condition must be rare to avoid thrashing in the allocation of B-channels, and must be handled as the first priority decision to avoid blocking trains associated with very low packet rates.

2. If any complete train is waiting for a transmission to the same destination, in step 180 of the flow chart, the B-channel is re-used to transmit it. Giving priority to the same destination re-use of the B-channel minimizes ISDN call overhead.

3. Transmission toward the same destination $d_i$ and the B-channel is fractionally allocated to a pool of n destinations (step 182), then the remaining $n-1$ destinations in the pool are checked for waiting trains (step 184); if one is found, the channel is assigned to it for transmittal. This allows maintenance of "stable" pools of low traffic rate destinations. If no train is waiting for a destination in the pool, or if the B-channel is not fractionally allocated to a pool of destinations, then a Flag-Queue-Size is checked (step 186), and if set, a new destination $d_i$ is computed as the one which contains the largest relative queue size. Thereafter, the channel process remains with decisions made by LTA.

9. Train Packaging

Packet sequences are mapped into cargo destinations, with many packet sequences being designated to a single cargo destination. Mapping of packet sequences to cargo destinations is supported by system master 110. Of particular importance, a cargo destination is divided into many trains of a format shown in FIG. 22 in accordance with an aspect of the invention. A train contains an integral number of packets. There is no limit to the size of a train, although the size is predetermined and all gateways preferably use the same maximum train size so that fixed size buffers can be implemented.

The content of a train is compressed as described hereinafter, then "framed" by adding start and stop sequences, a checksum and other frame control information. Peer protocol preferably specifies the description of a frame, including details of the frame header and data fields. This model enables the Deer protocol to operate at three different levels, PS packets (803 packets having a PS header), trains and frames. The following diagram shows transformations that a packet undergoes both as a packet arrives to a gateway from a local area network and as the packet is transferred back to a different local area network:

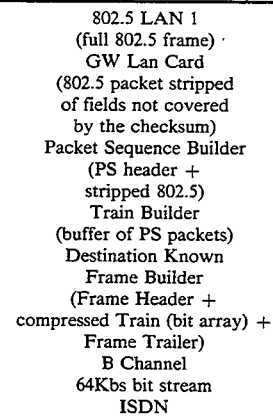

Figure 21A:
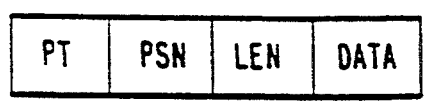
FIGS. 21a and 21b are diagrams respectively of a packet and a data frame implemented in the invention.
Figure 21B:
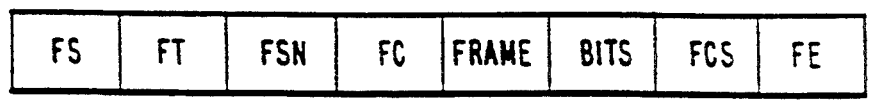

FIG. 21a shows a PS packet comprising the following fields: PT (packet type), PSN (Packet Sequence Number), LEN (Length of Stripped Packet) and Data. A data frame format, shown in FIG. 20b as another alternative, comprises the following fields: FS (Frame Start), FT (Frame Type), FSN (Frame Sequence Number), FC (Frame Control), Data, FCS (Frame Checksum) and FE (Frame End).

Figure 13:
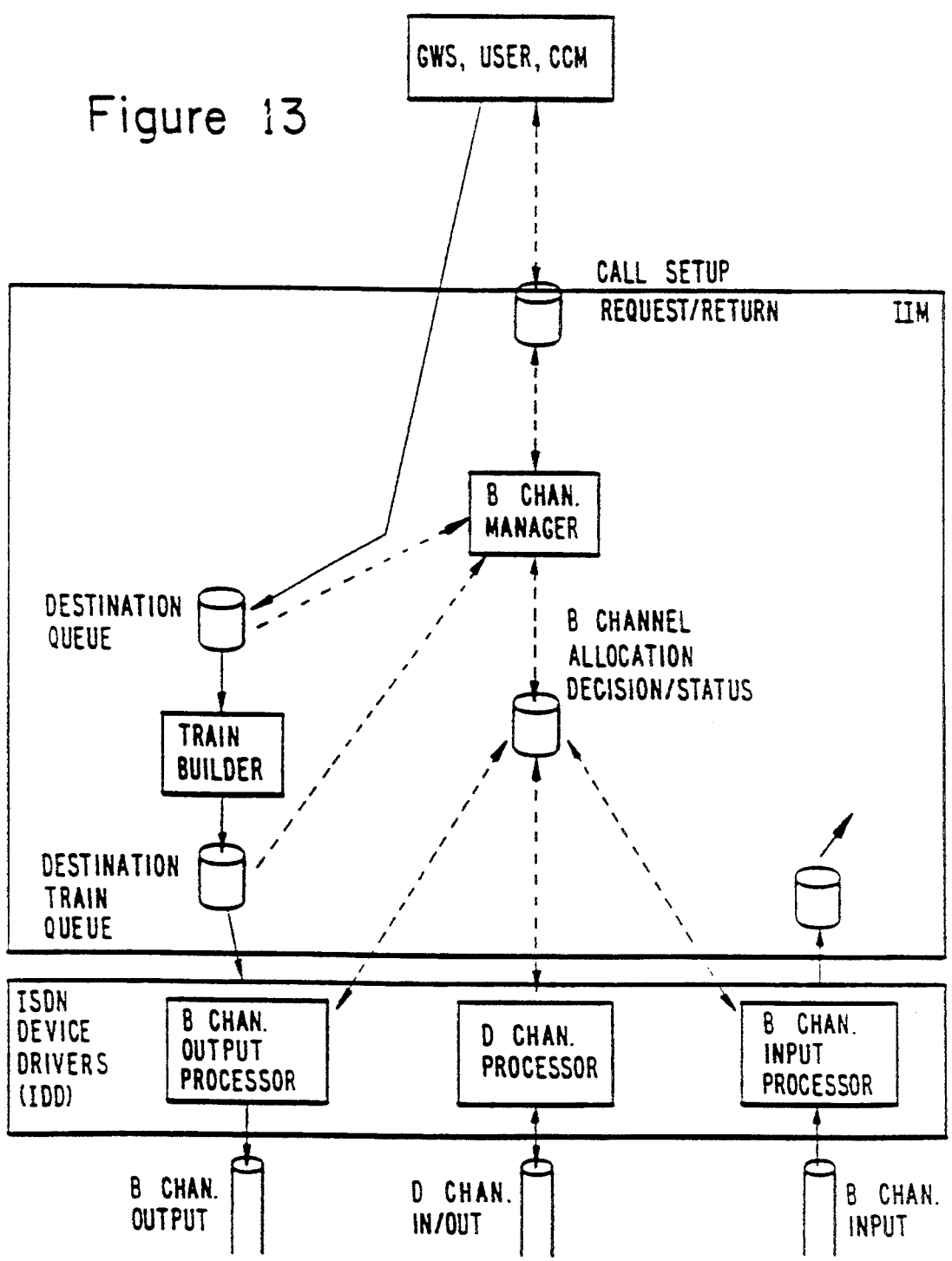
FIG. 13 is a symbolic diagram of the communication mode adapter incorporated in the ISDN line card.

Calls from a cargo destination manager determine the cargo destination for the received packet. The size of each queue and the hold time of each queue not being serviced by the train builder is communicated to the B-channel allocation manager (FIG. 13). The PS header has a packet sequence number to each packet, and the initial packet in a sequence is assigned sequence number 1. The PS header is removed from the 802 packet, checked and may be discarded.

Assuming the packet is valid, it is sequenced as follows. If the packet sequence number is 1, the bridge manager is notified that a new conversation with a remote node has been initiated by the remote node, and the bridge manager will update the bridge data base. If the sequence number is not 1, the number is checked to see if there was a gap from the last packet received. If a gap exists, the packet is queued, and a timer is set. If the missing packet arrives before the timer expires, the queue is re-ordered, and the packets are released in order. Otherwise, the number of received packet is recorded, and the packet is released. If a packet with a lower sequence number subsequently arrives, it is discarded. The 802 packet type is checked and 802 protocol translation is carried out if necessary, i.e., translating an 802.3 packet to an 802.5 packet.

The train builder requests packets from the cargo destination manager, allocates and fills buffers and maintains the number of bytes used in the buffer. Received buffers are unpacked and passed to the level above after being parsed to ensure that no error in transmission has occurred. A compressor compresses the input buffer using a compression algorithm as described in the next section. Incoming data is decompressed and tested to confirm that it will fit in a new buffer; if not, an error is indicated.

In frame management, a data frame is built by adding a frame header and trailer to the active bits in the buffer. The B-channel allocation manager indicates when the frame control bits should be set to "last frame". The frame is gated onto the B-channel for the destination found in the buffer control block. The buffer is freed after being gated to the B-channel. For incoming data, a buffer is allocated for the arriving frame. The frame is checked using the FCS, and any frames in error are discarded. Control frames are supplied to the system master. Data frames are supplied to the compression manager, and the B-channel allocation manager receives a "last frame" setting in the frame control (FC) field.

10. Data Compression

Another aspect of the invention provides data compression of packet trains, such as implementation of algorithms based on run-length encoding and Huffman encoding, and variations of Lempel-Ziv algorithms. Run-length encoding refers to replacement of sequences of identical source elements by a triple consisting of a special code indicating a "run" of elements, a count of the run length and the repeated element. Huffman encoding translates fixed-sized source elements into variable-sized codes, where the size of the output code and bits is approximately the logarithm of the probability of the source element. For some kinds of data, the probabilities of elements are well known and fixed translation tables are available. In more general cases, where the distribution of source elements is not known, a translation table can be computed for a sum block of input data, and transferred along with the data to allow decompression. This requires two passes over the input during compression; table size must be significantly smaller than the data blocks.

The Lempel-Ziv algorithms convert variable-sized input elements, or strings, into fixed-sized codes. Allowing long input sequences gives the possibility for higher compression ratios than are possible with fixed-size source element algorithms, such as Huffman encoding. The Lempel-Ziv algorithms are adaptive in that translation tables are built dynamically to reflect characteristics of the input, but require only a single pass during encoding. Decompression can be performed by dynamically building the same translation tables as were used during compression, using information implicit in the encoded data stream such as whether a particular code has been encountered.

The typical ranges of compression ratios of a compression algorithm selected to compress packet trains vary from unity for certain kinds of inherently random data such as floating point data or previously compressed data, to eight for some data bases containing large amounts of redundant or null data. The average compression ratios over mixed input types depends on the chosen samples, but ratios of between two and four for fairly large samples of mixed input found on real computer systems are common; two is proposed as an example in the preferred embodiment.

Error detection and correction, as a surrounding protocol on compressed data allow non-delivery of corrupted blocks, is required since any errors lead to catastrophic corruption of the rest of the packet train. The D-channel has built-in error protection by virtue of using the HDLC protocol which includes error detection, packet sequencing and re-transmission.

11. Virtual B-channel Formation

Figure 17:
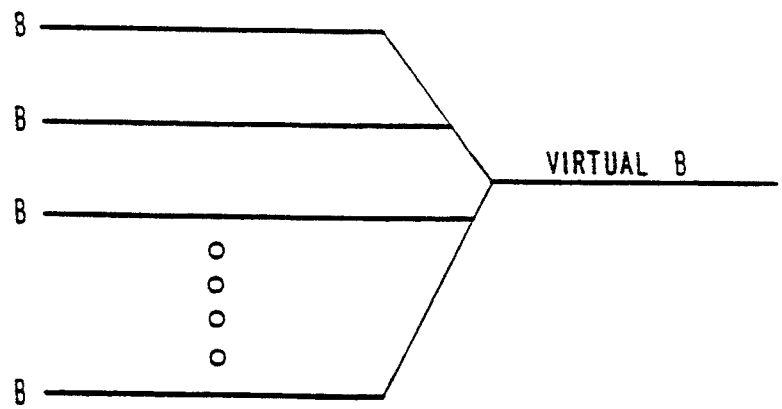
FIG. 17 is a symbolic diagram showing development of a virtual channel and its components.
Figure 18:
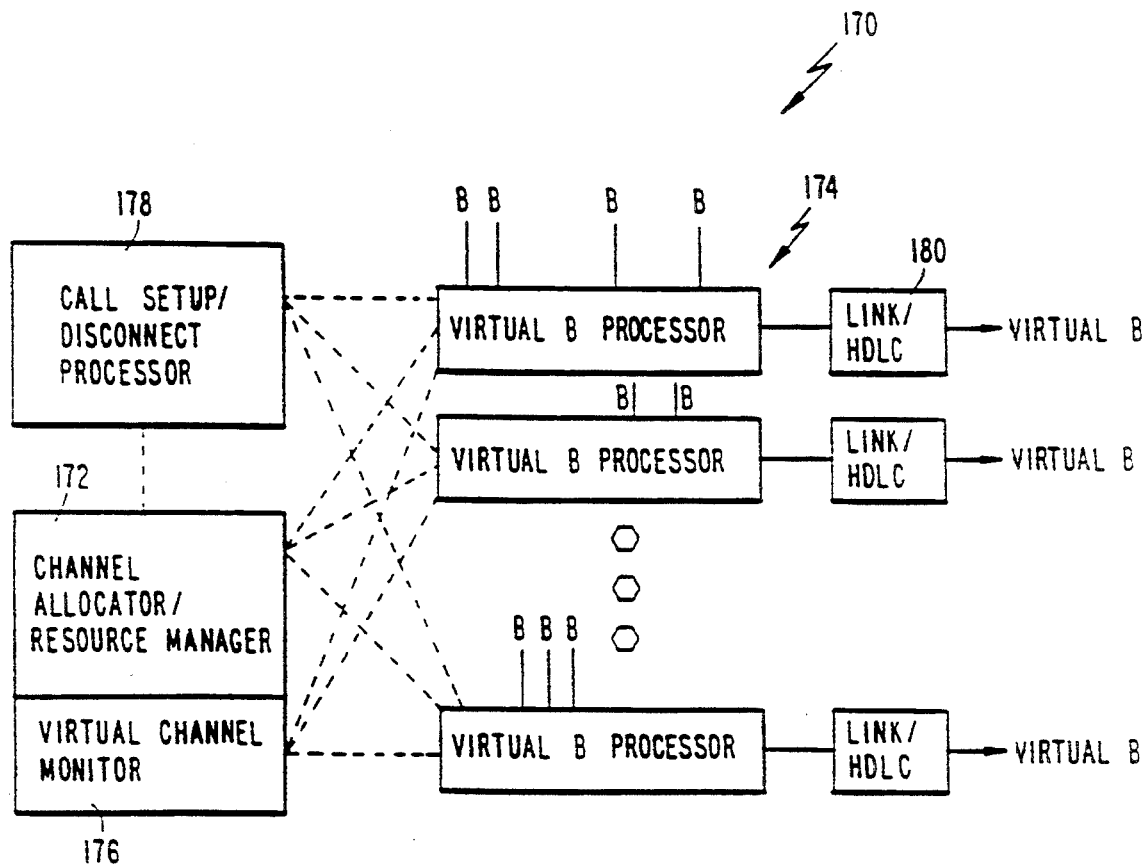
FIG. 18 is a block diagram of circuitry for carrying out LTA channel allocation in accordance with another aspect of the invention.

Referring to FIG. 17, virtual B channels are formed out of a B channel pool in response to traffic on the ISDN line. A controller 170 shown in FIG. 18, comprises a virtual B Allocator/Resource Manager 172 which opens a virtual B-channel with control attributes in table I, below, from the B-channel pool as requested. Manager 172 also assigns a virtual B processor 174 implemented from among a plurality of such processors, and handles related supporting global resources. The virtual B processors 174 at run time or initialization time provide the service of transparent addition and deletion of new or existing component channels in its virtual B-channel based on virtual B attributes. The processors 174 further provide transparent multiplexing of client data. Virtual B-channel monitor 176 carries out traffic and error monitoring of all virtual B-channels. Data traffic flow and allocation, day allocation and replacement of channels to dynamically alter bandwidth are performed by the monitor 176.

Call set-up/disconnect processor 178 sets up and disconnects protocol on the D-channel. Processor 178 interfaces to B-channel hardware to transform the B-channel call set-up or disconnect, and interfaces with the virtual B processors 174, resource manager 172 and client. HDLC/LAPD links 180 provide the variable links for clients, and are optional.

Component channels allocated for a virtual B-channel have the following four defined states: activated, deactivated, transient and steady. In the deactivated state, data transfer is forbidden although control protocol exchange is not. Component channels allocated or joined are initially in the deactivated state. A channel, deactivated for a sender immediately following the deactive_b command, described later, is queued for transmission. For a receiver, a channel is deactivated immediately after the command is received. Only a bi-directionally deactivated channel is removed and physically disconnected from the virtual channel of which it was a member.

In the activated state, both data and control protocol transfer are permitted. A channel is activated to a sender only after acknowledgement of the active_b command transmitted is received. For a receiver, a channel is activated immediately after this command is received.

The transient state is defined by guarding periods arriving before acknowledgements are received from the far-end. A virtual channel is transient when any component channels are transient. No data can be sent over a channel in the transient state.

A component channel is in the steady state if it is not in the transient state, that is, if it is activated or deactivated. A virtual channel is in the steady state if all its components are in the steady state.

A virtual B-channel is operative in two multiplexing modes, restricted mode and forced load-balancing mode. In the restricted mode, data received for transmission is sequentially distributed, one packet at a time, in a round-robin fashion over the steady activated component channels; deactivated channels are skipped. The far-end virtual B processor 174 receives and recovers data in the same round-robin sequence. In the load-balancing mode of operation, the distribution for transmissions over the channels follows a protocol of most-empty-channel-first for transmission. The receiver recovers it by the global sequence numbers by scanning, comparing and carrying out trace-back time-out presentation. During either distribution process, active_b commands, described below, are sent in-line on the deactivated component channels. For component channels to be deactivated, deactive_b commands are sent in-line over these channels in place of the data in the sequence. Time-fill SYNC_vB packets may be sent over channels in the restricted mode of operation to avoid "holes" in the data stream, and further can be used for time control in the load-balancing mode of operation.

12. Control and Multiplexing

The following are the command categories and their detailed format with bit definitions. This protocol assumes the use of flow control to be optional, at least to some degree, depending on the implementation and environment. In the restricted mode, this can be controlled by client link level protocol; outstanding transmissions preferably should not result in difference of twenty-six generations or more between the receiving and the far-end transmitting loop. The load-balancing mode has the same format except that all the numbered command category header-bytes described below will be two bytes in length.

* DATA

Ossnnnnn: one byte as header of client's data for transmit.

* RQST_Bs

101nnnnn: one byte header of one or multiple control bytes. The first control byte can further specify explicitly whether it is global. If it does not specify, it depends on the address bytes which follow. No address byte for the in-band operation is required, and multiple address bytes imply the in-band line is no explicitly included. The explicit global commands have the leftmost bit on, followed by explicitly specified address bytes. If the leftmost two bits are both on, it is a broadcast, and no address bytes follow. Multiple bytes are useful for off-band control. At present, only one byte of in-band control is employed. The leftmost third bit is reserved, and the fourth bit is for system control point specification. These are external or internal indicated by E and I respectively as follows. The last four bits define the commands of this category. At present, these are:

DEACTIV_Bs group: uwxlz, w bit is reserved and u defines two system points.

DEL_Bs - (OXOO | O), an external delete command
DEX_Bs - (DEL_Bs | 1), an DEL_Bs, followed by external setup
DIL_Bs - (DEL_Bs | 0X10), internally initiated delete command
DIX_Bs - (DEX_Bs | 0X10), DIL_Bs, followed by internal setup
ACTIV_Bs group: uwxOz, w bit is reserved, u the same as defined above.
ADD_Bs - (0X00 | 2), an external add command.
AID_Bs - (ADD_Bs | 0X10), an internally initiated ADD_Bs

* SYNC_vB

110nnnnn: one byte only, used for time-fill and synchronization.

* RA_Bs

111nnnnn: one byte header, followed by no or multiple optional bytes. This is an acceptance acknowledge in reply to a RQST_Bs, and in-band is implied if no other bytes follow. Similar to the case in RQST_Bs, the first by to which follows can further specify whether it is global. The leftmost two bits have exactly the same meanings, which describe the scope of the possible further succeeding address bytes. The leftmost third bit, if on, turns the whole meaning of the response into a negative acknowledgement, instead. The last five bits are the same as for RQST_Bs.

* MODE_vB

1000000m: for virtual channel operation and format specification. This has two members, MODE_rst with m=0 and MODE_lbc with m =1; MODE_rst defines the nnnnn five bit generation number in restricted mode. In the load-balancing mode, it handshakes with MODE_lbc, with thirteen (13) bits global sequence numbers, when opening a virtual B. The attributes of Table I below, to follow after these headers are optional. The mode negotiation can proceed only when all component channels are in deactivated states, or UNA will be received. if the optional attributes are not accepted, UNA will also be received. A REJ will be received if the remote end does not support or will not accept this request. In addition to this role of mode negotiations, MODE_vB resets the generation number or the global sequence number for transmitter and the corresponding variable back to 0 to restart and resets the transmitter and receiver (loop) pointers back to the first component position.

* RR

10000010: Informs the far-end receiver that this end is ready.

*

10000011: Informs the far-end receiver that his end is not ready.

* ATTRB vB

100000100: The parameters in Table I follow this for far-end negotiation.

* UA

10010000: This unnumbered positive response means acceptance in the mode negotiation. The same MODE_vB packet will be sent back as bi-direction initialization, following the UA. The UA is also used for acknowledgement to flow control commands RR and RNR. It is used for acceptance acknowledgement to ATTRB_vB as well as unnumbered commands.

* UNA

10010100: a negative response for refusing, used similarly to UA.

* REJ

10011100: as explained in the MODE_vB description.

All these unnumbered are in-band, although MODE_vB is for global. The "nnnnn" is a module 32 correlation generation number, or a zero based global sequence number, assigned to each round of transmissions in restricted mode of operation, or assigned and incremented by one for each numbered transmission in the load balanced mode. The "ss" in the DATA command, which has four values 11, 10, 01 nd 11, is for frame segmentation.

Processing of these commands is independent of their arriving timing phase with respect to other channels, once dequeued. The sequence numbers are for data synchronization across the component channels. A receiver variable "nr", used for synchronization, is incremented by one after each round, or each actual numbered reception. This is a recovery process corresponding to the far-end sender's sequence number incremented for each round, or each data or numbered command transmission.

Once mode negotiation is done, sequence number comparison is then started. The selected virtual B processor 174 polls the receiving queue and then steps to the next component channel. In restricted mode, if nothing arrives in the queue of an activated channel, the processor stays and waits indefinitely. In the case of MAC implementation, the processor waits indefinitely or steps after a time out period if a trace-back timer has been started, regardless of the channel states. At a deactivated component channel, the processor hunts through all following contiguous deactivated channels for any arrival, and does trace-back get, steps or stays until the trace-back timer expires, if arrival time inversion is found. The time-fill SYNC_vB commands are to be received over their preceding channels, if no other commands or data are available through these channels. The receptions in load-balancing mode are always in hunting mode, across the full range of component channels. The processor continues looking for the correct sequence number for presentation. Trace-back time-out presentation scheme applies in either mode.

Parameters which characterize a virtual B-channel to be opened and used to monitor the channel hereinafter are listed in Table I.

The attributes of the virtual B thus define the bandwidth control behavior.

If line error rate is above a predefined threshold rate for a predetermined period of time, line replacement operations are reduced in addition to bandwidth control.

14. Conclusion

As described hereinabove, an ISDN gateway for local area networks comprises circuit boards resident at each LAN for carrying out protocol conversion and other network interface functions. Two embodiments of the gateway provide bridger type and router type gateway services. To improve bandwidth utilization of the ISDN line while transferring voice or data, a B-channel allocation algorithm executed by the gateway and the ISDN line dynamically allocates bandwidth by monitoring traffic at each destination queue and responsively allocating or deallocating virtual B-channels. Bandwidth utilization is optimized by packaging data packets into trains that are transmitted to the destination when the train is completed and upon satisfaction of other conditions. Each train undergoes data compression by execution of a suitable compression algorithm.

In this disclosure, there is shown and described only

TABLE I

| Virtual B Channel Attributes (in C language representation) | |
| --- | --- |
| typedef struct ( | |
| long err_threshold; | /* one out of err_threshold frames */ |
| short err_action thres; | /* act on contig err_action_thres */ |
| short err_action_permit; | /* allow deactivation of errored channel */ |
| short max_band_width; | /* max allowed bandwidth */ |
| short high_util_thres; | /* high effective % band width threshold */ |
| short high_busy_util_thres; | /* one high util out of high_busy_util */ |
| short high_action_thres; | /* act on contig high_busy_util_thres */ |
| short high_action_permit; | /* allow bandwidth increment actions */ |
| short min_band_width; | /* minimum allowed bandwidth */ |
| short low_util_thres; | /* low affective % bandwidth threshold */ |
| short low_busy_util_thres; | /* one low util out of low_busy_util */ |
| short low_action_thres; | /* act on contig low_busy_util_thres */ |
| short low_action_permit; | /* allow bandwidth decrement actions */ |
| short set_up_retry_thres; | /* max contig retry before giving up */ |
| short no action_thres; | /* no action threshold time */ |
| ) VB_THRESHOLD; | |

13. Traffic Sensing

Sensing of traffic for automatic control of bandwidth is carried out as follows. Assuming that the sampling rate is one sample every two seconds, the maximum bandwidth of the virtual channel opened is set to be five B-channels, definition of the high_util thres is 75%, of a high_busy_util_thres is 5, the high action_thres is ten and the initial channel opened is one B-channel (64 Kbps). As transmission rate increases steadily from an original effective rate of 45 Kbps to 55 Kbps, a procedure for adding a new line is automatically initiated thirty seconds later. This assumes that the high_action_permit is true. A new element channel is added and the new line utilization will be 42.3% if traffic is maintained at 55 Kbps. An increase in input data rate thus drives up bandwidth growth. If the input data rate continues to increase, the bandwidth eventually will reach five B-channels as a maximum.

When traffic decreases, assuming that the low_util thres is 30%, and the low_busy_util_thres and low action_thres are five and ten, respectively, no line will be deleted from the virtual B if a pattern of the driving traffic does not have a utilization of less than 30% in any continuous ten seconds or there is no consecutive repeating ten or more times. If the low action_permit is false, no reduction in virtual B-channels is permitted.

the preferred embodiment of the invention, but, as aforementioned, it is to be understood that the invention is capable of use in various other combinations and environments and is capable of changes or modifications within the scope of the inventive concept as expressed herein.

We claim:

1. An ISDN gateway at a customer premises for interfacing a local area network having at least one host to an ISDN line, comprising:
   at least one circuit module resident with said host for interfacing said local area network to said ISDN line, said at least one circuit module including
   (a) means for performing protocol conversion of data flowing between said local area network and said ISDN line through said gateway;
   (b) means for establishing input and output destination queues for said gateway;
   (c) means for measuring traffic flow at each of said input and output destination queues during a particular time interval;
   (d) means responsive to said traffic flow measuring means for dynamically allocating channel bandwidth on said ISDN line;

wherein said at least one circuit module includes a communication mode adaptor (CMA) providing modem-like dial up protocols.

2. An ISDN gateway as recited in claim 1, wherein said at least one circuit module includes system master means for managing a configuration of said gateway.

3. The ISDN gateway as recited in claim 2, wherein said at least one circuit module further includes means for accessing system master means of other gateways on said ISDN line.

4. The ISDN gateway as recited in claim 1, wherein said at least one circuit module includes an ISDN manager means for receiving and routing incoming data, said ISDN manager including said means for establishing, said means for measuring, said means for dynamically allocating, and means for setting up, selectively, circuit switched and virtual circuit calls.

5. The ISDN gateway as recited in claim 1, wherein said at least one circuit module includes an ISDN device driver.

6. The ISDN gateway as recited in claim 1, wherein said at least one circuit module includes a configuration control manager storing a table of gateway operating parameters.

7. The gateway of claim 1, wherein said gateway includes means for performing bridger gateway services.

8. The gateway of claim 1, wherein said gateway includes means for performing router gateway services.

9. An ISDN gateway at a customer premises for interfacing a local area network having at least one host to an ISDN line, comprising:

at least one circuit module resident with said host for interfacing said local area network to said ISDN line, said at least one circuit module including (a) means for performing protocol conversion of data flowing between said local area network and said ISDN line through said gateway;

(b) means for establishing input and output destination queues for said gateway;

(c) means for measuring traffic flow at each of said input and output destination queues during a particular time interval;

(d) means responsive to said traffic flow measuring means for dynamically allocating channel bandwidth on said ISDN line; wherein said means for dynamically allocating includes long term channel allocation means responsive to a polling means for allocating or deallocating transmission channels to a particular destination on said line depending upon data flow traffic to said destination and particular channel parameters; and short term channel allocation means, overriding said long term channel allocation means in response to predetermined conditions, for allocating or deallocating transmission channels on said line.

10. The gateway of claim 9, including means for assembling pluralities of packets into trains of said packets, each train consisting of a predetermined number of packets, and means for transmitting said trains onto said ISDN line.

11. The gateway of claim 8, including means for compressing said trains of said packets prior to transmission thereof onto said ISDN line.

12. An ISDN gateway system at a customer premises for interfacing a remote host to a local area network via an ISDN line, comprising:

at least a first gateway module resident with said remote host for connecting said remote host to said ISDN line, at least a second gateway module resident with said local area network for interfacing said local area network to said ISDN line, each of said first and second gateway modules including (a) means for performing protocol conversion of data flowing between said remote host or said local area network and said ISDN line through said gateway modules;

(b) means for establishing input and output destination queues for said gateway system;

(c) means for measuring traffic flow at each of said input and output destination queues during a particular time interval; and (d) means responsive to said traffic flow measuring means for dynamically allocating channel bandwidth on said ISDN line.

13. The network of claim 12, wherein said second gateway module includes means for performing bridger gateway services.

14. The network of claim 12, wherein said second gateway module includes means for performing router gateway services.

* * * * *